United States Patent
Kaneko

(10) Patent No.: US 10,128,516 B2
(45) Date of Patent: Nov. 13, 2018

(54) FUEL CELL SYSTEM

(71) Applicant: NISSAN MOTOR CO., LTD., Yokohama-shi, Kanagawa (JP)

(72) Inventor: Youhei Kaneko, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/327,131

(22) PCT Filed: Jul. 24, 2014

(86) PCT No.: PCT/JP2014/069625
§ 371 (c)(1),
(2) Date: Jan. 18, 2017

(87) PCT Pub. No.: WO2016/013092
PCT Pub. Date: Jan. 28, 2016

(65) Prior Publication Data
US 2017/0162886 A1    Jun. 8, 2017

(51) Int. Cl.
*H01M 8/04111* (2016.01)
*H01M 8/04082* (2016.01)
(Continued)

(52) U.S. Cl.
CPC .... *H01M 8/04111* (2013.01); *H01M 8/04201* (2013.01); *H01M 8/04402* (2013.01); *H01M 8/04753* (2013.01); *H01M 8/04776* (2013.01); *H01M 8/04992* (2013.01); *H01M 8/04395* (2013.01); *H01M 8/04425* (2013.01);
(Continued)

(58) Field of Classification Search
CPC ......... H01M 8/04029; H01M 8/04097; H01M 8/04111; H01M 8/04992; H01M 8/04201; H01M 8/04402; H01M 8/04753; H01M 8/04776; H01M 8/04395; H01M 8/04425; H01M 8/04619; H01M 2250/20;
(Continued)

(56) References Cited

U.S. PATENT DOCUMENTS 5,083,425 A * 1/1992 Hendriks ............... F02C 3/36
                                                  60/39.183
5,532,573 A * 7/1996 Brown ................ B60L 11/1881
                                                     322/22
(Continued)

FOREIGN PATENT DOCUMENTS

DE    10 2007 007934 A1    8/2008
JP        2003-031244 A     1/2003
(Continued)

*Primary Examiner* — Emma K Frick
*Assistant Examiner* — Brian L Cassidy
(74) *Attorney, Agent, or Firm* — Foley & Lardner LLP

(57) ABSTRACT

A control device for fuel cell includes, comprising a compressor configured to supply cathode gas to a fuel cell, a driving device including at least two compressor driving sources including a drive motor and a driving body using a power source other than the drive motor, the driving device configured to drive the compressor by the driving sources; and a control unit. The control unit configured to control a state of the power source on the basis of an operating state of the fuel cell, and the control unit selects the driving source to be used out of the compressor driving sources on the basis of the state of the power source.

12 Claims, 18 Drawing Sheets

(51) Int. Cl.
*H01M 8/0438* (2016.01)
*H01M 8/04746* (2016.01)
*H01M 8/04992* (2016.01)
*H01M 8/04537* (2016.01)

(52) U.S. Cl.
CPC .... *H01M 8/04619* (2013.01); *H01M 2250/20* (2013.01); *Y02T 90/32* (2013.01)

(58) Field of Classification Search
CPC ...... F02C 6/00; F02C 7/32; F02C 1/02; F01D 15/08; F01D 15/10; B64D 41/00; B60L 11/1881
See application file for complete search history.

(56) References Cited

U.S. PATENT DOCUMENTS

| | | | | | |
|---|---|---|---|---|---|
| 5,678,647 | A * | 10/1997 | Wolfe | | B60L 11/1881 429/430 |
| 6,672,415 | B1 * | 1/2004 | Tabata | | B60K 6/365 180/65.25 |
| 7,152,408 | B2 * | 12/2006 | Saliger | | F01B 17/025 60/641.8 |
| 8,062,799 | B2 * | 11/2011 | Jahnke | | H01M 8/04291 429/415 |
| 8,905,166 | B2 * | 12/2014 | Dalum | | B60W 20/10 180/65.22 |
| 9,070,912 | B2 * | 6/2015 | Hausmann | | F01D 1/026 |
| 9,570,766 | B2 * | 2/2017 | Bozzolo | | H01M 8/04014 |
| 9,638,102 | B2 * | 5/2017 | Kobayashi | | F02C 6/08 |
| 9,666,885 | B2 * | 5/2017 | Bozzolo | | H01M 8/04111 |
| 9,716,504 | B2 * | 7/2017 | Fujita | | H02J 7/34 |
| 9,776,492 | B2 * | 10/2017 | Chen | | B60K 1/04 |
| 9,802,505 | B2 * | 10/2017 | Oda | | B60L 11/1881 |
| 2002/0064695 | A1 * | 5/2002 | Raiser | | B60L 11/1885 429/432 |
| 2002/0155336 | A1 * | 10/2002 | Acker | | F02C 1/05 429/444 |
| 2002/0163200 | A1 * | 11/2002 | Oglesby | | B60L 11/1881 290/52 |
| 2003/0106726 | A1 * | 6/2003 | Yoshii | | B60K 6/26 180/65.1 |
| 2005/0091981 | A1 * | 5/2005 | Saliger | | F01B 17/025 60/716 |
| 2005/0260466 | A1 * | 11/2005 | Kobayashi | | H01M 8/04007 429/429 |
| 2006/0113129 | A1 * | 6/2006 | Tabata | | B60K 6/365 180/65.25 |
| 2006/0237583 | A1 * | 10/2006 | Fucke | | B64D 13/06 244/58 |
| 2008/0145725 | A1 * | 6/2008 | Nau | | B60L 11/1881 429/444 |
| 2009/0142644 | A1 * | 6/2009 | Osborne | | F01D 15/10 429/415 |
| 2009/0155656 | A1 * | 6/2009 | Yamada | | H01M 8/04029 429/513 |
| 2009/0197145 | A1 * | 8/2009 | Yamada | | H01M 8/04097 429/415 |
| 2009/0202370 | A1 * | 8/2009 | Fujii | | B66F 9/22 417/411 |
| 2009/0309364 | A1 * | 12/2009 | Marconi | | B64D 41/00 290/52 |
| 2011/0097632 | A1 * | 4/2011 | Sumser | | F01D 15/00 429/408 |
| 2011/0207023 | A1 * | 8/2011 | Becker | | H01M 8/04014 429/512 |
| 2012/0119020 | A1 * | 5/2012 | Burns | | B64D 27/00 244/58 |
| 2014/0349808 | A1 * | 11/2014 | Huang | | B60K 6/32 477/3 |
| 2014/0350824 | A1 * | 11/2014 | Nakao | | F02D 29/02 701/112 |
| 2015/0285191 | A1 * | 10/2015 | Kitada | | H01M 8/04201 60/605.2 |
| 2017/0012305 | A1 * | 1/2017 | Aoki | | H01M 8/0485 |
| 2017/0207469 | A1 * | 7/2017 | Kaneko | | H01M 8/04111 |
| 2017/0226934 | A1 * | 8/2017 | Robic | | F02C 7/32 |
| 2017/0260902 | A1 * | 9/2017 | Nakamoto | | F01K 23/10 |
| 2018/0053950 | A1 * | 2/2018 | Buehler | | H01M 8/04029 |

FOREIGN PATENT DOCUMENTS

| | | |
|---|---|---|
| JP | 2005-259439 A | 9/2005 |
| JP | 2009-146832 A | 7/2009 |
| JP | 2010-218876 A | 9/2010 |
| JP | 2010-238417 A | 10/2010 |
| JP | 2012-164457 A | 8/2012 |
| WO | WO 2009/129012 A1 | 10/2009 |

* cited by examiner

FUEL CELL SYSTEM

TECHNICAL FIELD

The present invention relates to a fuel cell system.

BACKGROUND ART

JP2005-259439A discloses a fuel cell system with a cathode gas supplying device configured to supply cathode gas (air) to a fuel cell by a compressor by driving the compressor by either anode gas (hydrogen gas) supplied to the fuel cell from a high-pressure tank or an electric motor.

Further, although not directly pertinent to the cathode gas supplying device, JP2003-31244A discloses an anode off-gas circulation device in a fuel cell system. The anode off-gas circulation device includes a compressor configured to reflux anode off-gas discharged from a fuel cell to an anode supply passage and a turbine configured to rotate the compressor by being driven by cathode off-gas discharged from the fuel cell.

SUMMARY OF INVENTION

If a system is configured to drive a compressor only by anode gas supplied from a high-pressure tank to a fuel cell like the fuel cell system disclosed in JP2005-259439A, the compressor cannot be driven and cathode gas cannot be supplied to the fuel cell if the anode gas is not supplied to the fuel cell. On the other hand, if a system is configured to drive a compressor only by an electric motor, power performance required for the electric motor to drive the compressor increases, leading to the enlargement of the electric motor.

The present invention aims to miniaturize a drive motor for driving a compressor.

According to one embodiment, a control device for fuel cell includes a compressor configured to supply cathode gas to a fuel cell, a driving device including at least two compressor driving sources including a drive motor and a driving body using a power source other than the drive motor, the driving device configured to drive the compressor by the driving sources; and a control unit. The control unit configured to control a state of the power source on the basis of an operating state of the fuel cell, and the control unit selects the driving source to be used out of the compressor driving sources on the basis of the state of the power source.

DESCRIPTION OF EMBODIMENTS

Hereinafter, embodiments of the present invention are described with reference to the drawings and the like.

First Embodiment

Figure 1:
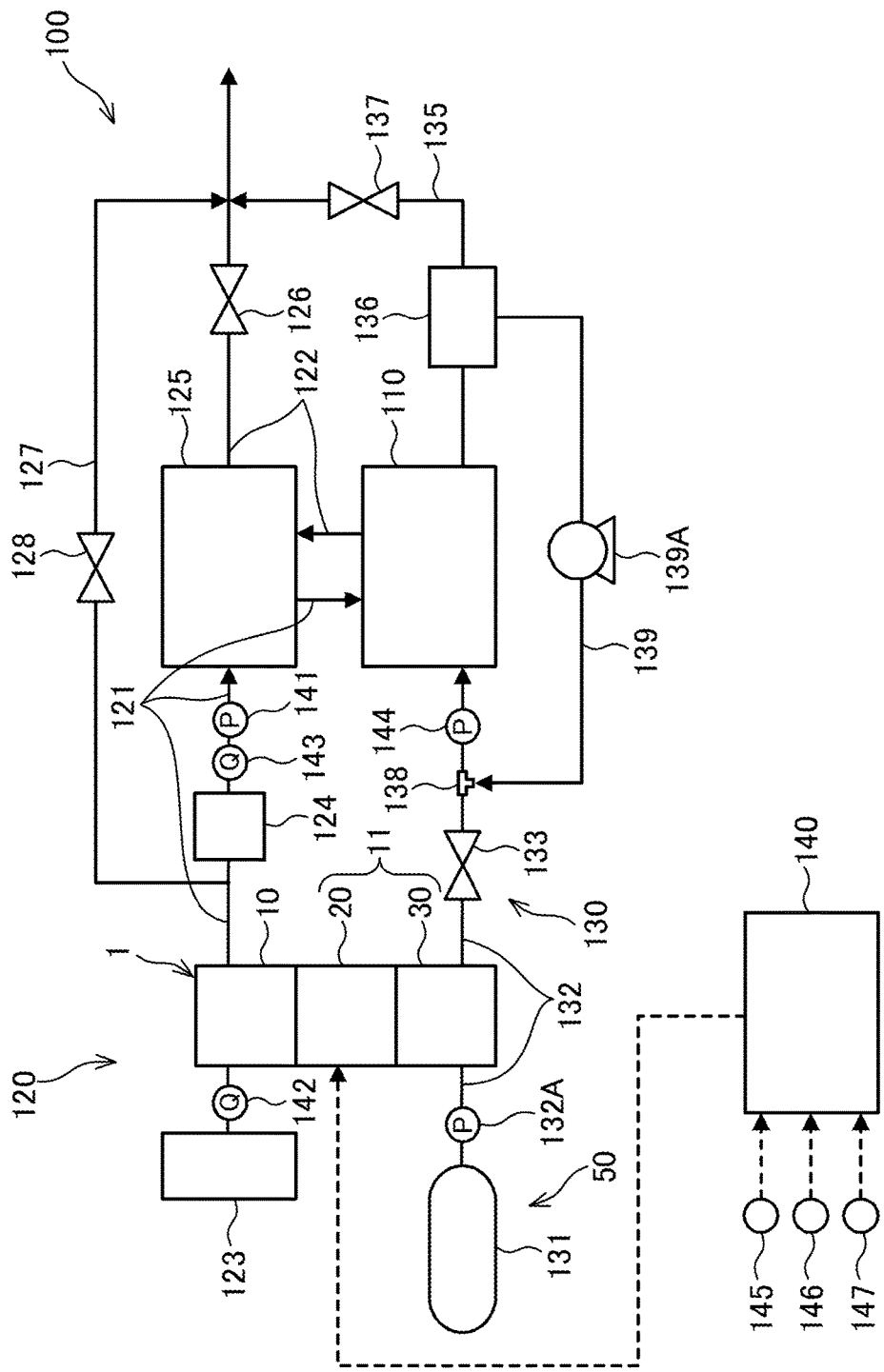
FIG. 1 is a schematic configuration diagram of a fuel cell system according to a first embodiment of the present invention.

A fuel cell system 100 for vehicle according to a first embodiment of the present invention is described with reference to FIG. 1.

The fuel cell system 100 includes a fuel cell stack 110, a cathode gas supplying/discharging device 120, an anode gas supplying/discharging device 130 and a controller 140.

The fuel cell stack 110 is a laminated battery in which a plurality of fuel cells are laminated. The fuel cell stack 110 generates power necessary for vehicle travel upon receiving the supply of anode gas and cathode gas. This generated power is used in various auxiliary machines used when the fuel cell system is operated and a motor for driving wheels.

The cathode gas supplying/discharging device 120 supplies the cathode gas to the fuel cell stack 110 and discharges cathode off-gas discharged from the fuel cell stack 110 to outside. The cathode gas supplying/discharging device 120 includes a cathode gas supply passage 121, a cathode gas discharge passage 122, a gas filter 123, a cathode gas supplying device 1, a cathode gas cooler 124, a water recovery device (hereinafter, referred to as "WRD") 125, a cathode pressure control valve 126, a bypass passage 127, a bypass valve 128, a cathode pressure sensor 141, a first air flow sensor 142 and a second air flow sensor 143.

The cathode gas supply passage 121 is a passage in which the cathode gas to be supplied to the fuel cell stack 110 flows. One end of the cathode gas supply passage 121 is connected to the gas filter 123 and the other end is connected to a cathode gas inlet part of the fuel cell stack 110.

The cathode gas discharge passage 122 is a passage in which the cathode off-gas discharged from the fuel cell stack 110 flows. One end of the cathode gas discharge passage 122 is connected to a cathode gas outlet part of the fuel cell stack 110 and the other end is formed as an opening end. The cathode off-gas is mixture gas containing the cathode gas, steam generated by an electrode reaction and the like.

The gas filter 123 is provided on the leading end of the cathode gas supply passage 121. The gas filter 123 removes dust, dirt and the like contained in air (cathode gas) to be taken into the cathode gas supply passage 121.

The cathode gas supplying device 1 is provided downstream of the gas filter 123 in the cathode gas supply passage 121. The cathode gas supplying device 1 supplies the cathode gas having foreign matters removed by the gas filter 123 to the fuel cell stack 110. The cathode gas supplying device 1 is described in detail with reference to FIGS. 2A and 2B.

Figure 2A:
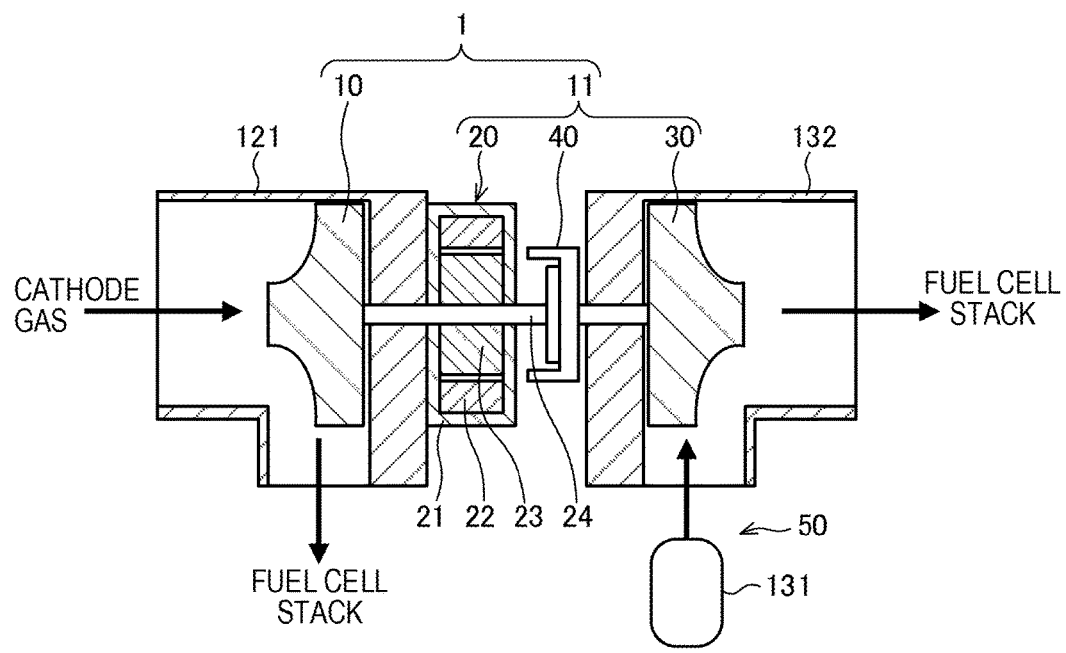
FIG. 2A is a sectional view showing a cathode gas supplying device in a clutch engaged state.

As shown in FIG. 2A, the cathode gas supplying device 1 includes a compressor 10 configured to feed the cathode gas under pressure and a driving device 11 configured to drive the compressor 10. The driving device 11 includes an electric motor 20 as a first driving source configured to drive the compressor 10, a turbine 30 as a second driving source configured to drive the compressor 10 and a clutch 40 provided between the electric motor 20 and the turbine 30. In the present embodiment, a high-pressure tank 131 configured to supply the anode gas to the fuel cell stack 110 is used as a working fluid supplying device 50 configured to supply working fluid for driving the turbine 30 to the turbine 30, and the anode gas supplied from the high-pressure tank 131 is utilized as the working fluid. As just described, the cathode gas supplying device 1 includes at least two compressor driving sources including the electric motor 20 and the turbine 30 configured to convert energy of the anode gas serving as a power source into a drive force, and drives the compressor 10 by these compressor driving sources.

The compressor 10 is provided in the cathode gas supply passage 121. The compressor 10 is arranged between the gas filter 123 and the cathode gas cooler 124. The compressor 10 is configured to supply the cathode gas to the fuel cell stack 110 by being rotationally driven. The compressor 10 is driven by motive power of either one or both of the electric motor 20 and the turbine 30.

The electric motor 20 is arranged between the cathode gas supply passage 121 and an anode gas supply passage 132. The electric motor 20 includes a motor case 21, a stator 22 fixed to the inner peripheral surface of the motor case 21, a rotor 23 rotatably arranged inside the stator 22 and an output rotary shaft 24 provided in the rotor 23.

The electric motor 20 has a function as a motor to be rotationally driven upon receiving the supply of power from an external power supply or the like and a function as a generator configured to generate power by being rotationally driven by an external force.

One end of the output rotary shaft 24 of the electric motor 20 is connected to the compressor 10 and the other end thereof is connected to the turbine 30 via the clutch 40.

The turbine 30 is provided in the anode gas supply passage 132. The turbine 30 is arranged between the high-pressure tank 131 and an anode pressure control valve 133. The turbine 30 is configured to be rotationally driven by the anode gas (working fluid) supplied from the high-pressure tank 131 to the fuel cell stack 110. Specifically, the turbine 30 is configured to convert energy of the anode gas into a drive force. In the present embodiment, the high-pressure tank 131 for supplying the anode gas to the fuel cell stack 110 is utilized as the working fluid supplying device 50 configured to supply the working fluid to the turbine 30. A rotational drive force of the turbine 30 is transmitted to the compressor 10 via the clutch 40 and the output rotary shaft 24 of the electric motor 20.

The compressor 10, the electric motor 20 and the turbine 30 are arranged such that a rotation center axis of the compressor 10, the output rotary shaft 24 of the electric motor 20 and a rotation center axis of the turbine 30 are coaxial. By such an arrangement, the cathode gas supplying device 1 can have a compact configuration.

Figure 2B:
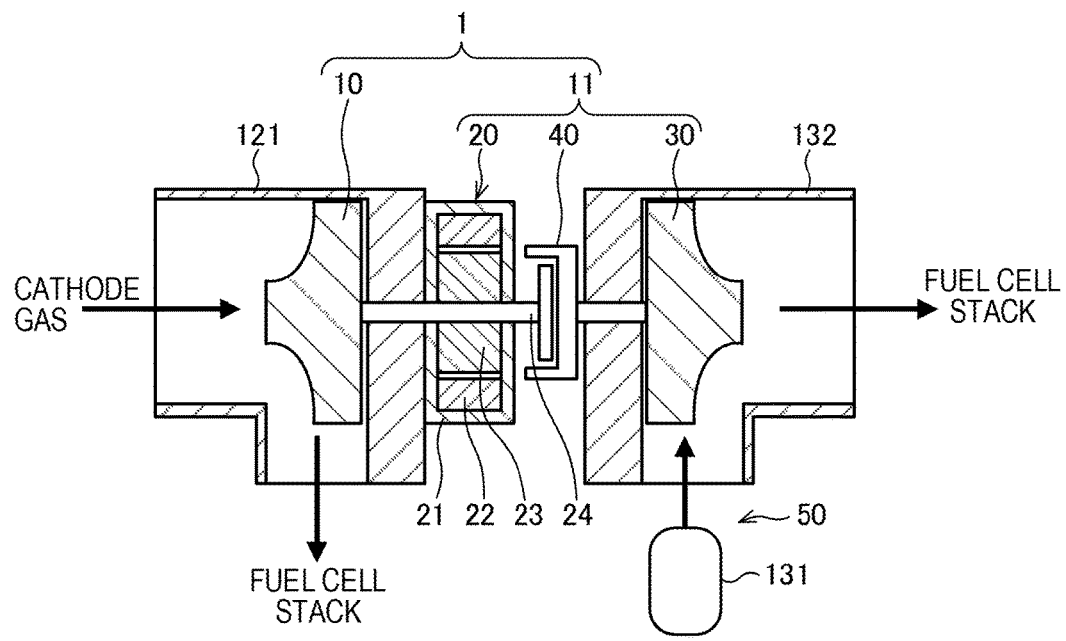
FIG. 2B is a sectional view showing the cathode gas supplying device in a clutch released state.

The clutch 40 is a power transmitting device configured to switch a connected state of the output rotary shaft 24 of the electric motor 20 and the turbine 30. As shown in FIG. 2A, the output rotary shaft 24 of the electric motor 20 and the turbine 30 are connected in a connected state of the clutch 40 (including a half-clutch state). As shown in FIG. 2B, the connection of the output rotary shaft 24 of the electric motor 20 and the turbine 30 is shut off in a released state of the clutch 40.

In the cathode gas supplying device 1, each of the electric motor 20 and the turbine 30 functions as an independent driving source for the drive of the compressor 10.

Specifically, in the clutch connected state shown in FIG. 2A, the compressor 10 can be driven only by the rotational drive force of the turbine 30 rotationally driven upon receiving the supply of the anode gas and the cathode gas can be supplied to the fuel cell stack 110. Further, in the clutch connected state shown in FIG. 2A, the compressor 10 can be driven by the rotational drive force of the electric motor 20 rotationally driven by power and that of the turbine 30 rotationally driven upon receiving the supply of the anode gas and the cathode gas can be supplied to the fuel cell stack 110.

On the other hand, in the clutch released state shown in FIG. 2B, the compressor 10 can be driven only by the rotational drive force of the electric motor 20 rotationally driven by power and the cathode gas can be supplied to the fuel cell stack 110. As just described, when the compressor 10 is driven only by the rotational drive force of the electric motor 20, the turbine 30 is prevented from becoming a load of the electric motor 20 by being separated. In this way, a reduction in the responsiveness of the electric motor 20 due to the turbine 30 acting as a load can be prevented.

Referring back to FIG. 1, the cathode gas cooler 124 is provided downstream of the cathode gas supplying device 1 in the cathode gas supply passage 121. The cathode gas cooler 124 cools the cathode gas discharged from the cathode gas supplying device 1.

The WRD 125 is provided downstream of the cathode gas cooler 124 in the cathode gas supply passage 121. The WRD 125 is provided to cross over a downstream part of the cathode gas supply passage 121 and an upstream part of the cathode gas discharge passage 122. The WRD 125 recovers moisture in the cathode off-gas flowing in the cathode gas discharge passage 122 and humidifies the cathode gas flowing in the cathode gas supply passage 121 with that recovered moisture.

The cathode pressure control valve 126 is provided downstream of the WRD 125 in the cathode gas discharge passage 122. The cathode pressure control valve 126 is controlled to open and close by the controller 140 and adjusts a pressure of the cathode gas to be supplied to the fuel cell stack 110.

The bypass passage 127 is a passage configured to directly discharge part of the cathode gas supplied from the cathode gas supplying device 1 to the cathode gas discharge passage 122 without via the fuel cell stack 110. One end of the bypass passage 127 is connected to a part of the cathode gas supply passage 121 between the cathode gas supplying device 1 and the cathode gas cooler 124 and the other end is connected to a part of the cathode gas discharge passage 122 downstream of the cathode pressure control valve 126.

The bypass valve 128 is provided in the bypass passage 127. The bypass valve 128 is controlled to open and close by the controller 140 and adjusts a flow rate (bypass flow rate) of the cathode gas passing in the bypass passage 127.

The cathode pressure sensor 141 is provided between the cathode gas cooler 124 and the WRD 125 in the cathode gas supply passage 121. The cathode pressure sensor 141 detects a pressure of the cathode gas to be supplied to the fuel cell stack 110.

The first air flow sensor 142 is provided upstream of the compressor 10 in the cathode gas supply passage 121. The first air flow sensor 142 detects a flow rate of the cathode gas to be sucked into the compressor 10 (hereinafter, referred to as a "compressor suction flow rate"). A detection value of this first air flow sensor 142 is referred to as a "detected compressor suction flow rate" below.

The second air flow sensor 143 is provided between the cathode gas cooler 124 and the WRD 125 in the cathode gas supply passage 121. The second air flow sensor 143 detects a flow rate of the cathode gas to be supplied to the fuel cell stack 110 out of the cathode gas discharged from the compressor 10 (hereinafter, referred to as a "stack supply flow rate"). The stack supply flow rate is a flow rate obtained by subtracting the bypass flow rate from a compressor supply flow rate. A detection value of this second air flow sensor 143 is referred to as a "detected stack supply flow rate" below.

Next, the anode gas supplying/discharging device 130 is described. The anode gas supplying/discharging device 130 supplies the anode gas to the fuel cell stack 110 and discharges anode off-gas discharged from the fuel cell stack 110 to the cathode gas discharge passage 122. The anode gas supplying/discharging device 130 includes the high-pressure tank 131, the anode gas supply passage 132, the anode pressure control valve 133, an anode gas discharge passage 135, a buffer tank 136, a purge valve 137 and an anode pressure sensor 144.

The high-pressure tank 131 is a gas storage container configured to store the anode gas (hydrogen gas) to be supplied to the fuel cell stack 110 in a high-pressure state. In the present embodiment, this high-pressure tank 131 also functions as the working fluid supplying device 50 for supplying the working fluid to the turbine 30.

The anode gas supply passage 132 is a passage configured to supply the anode gas discharged from the high-pressure tank 131 to the fuel cell stack 110. One end of the anode gas supply passage 132 is connected to the high-pressure tank 131 and the other end is connected to an anode gas inlet part of the fuel cell stack 110. A working fluid pressure sensor 132A configured to detect a pressure of the anode gas as the working fluid to be supplied to the turbine 30 is provided between the high-pressure tank 131 and the turbine 30 of the cathode gas supplying device 1 in the anode gas supply passage 132.

The anode pressure control valve 133 is provided downstream of the turbine 30 of the cathode gas supplying device 1 in the anode gas supply passage 132. The anode pressure control valve 133 is controlled to open and close by the controller 140 and adjusts a pressure and a flow rate of the anode gas to be supplied to the fuel cell stack 110.

The anode gas discharge passage 135 is a passage in which the anode off-gas discharged from the fuel cell stack 110 flows. One end of the anode gas discharge passage 135 is connected to an anode gas outlet part of the fuel cell stack 110 and the other end is connected to a part of the cathode gas discharge passage 122 downstream of the cathode pressure control valve 126.

The buffer tank 136 is provided in the anode gas discharge passage 135. The buffer tank 136 is a container configured to temporarily store the anode off-gas flowing from the anode gas discharge passage 135. The anode off-gas pooled in the buffer tank 136 is discharged to the cathode gas discharge passage 122 when the purge valve 137 is opened.

The purge valve 137 is provided downstream of the buffer tank 136 in the anode gas discharge passage 135. The purge valve 137 is controlled to open and close by the controller 140 and controls a flow rate (purge flow rate) of the anode off-gas discharged from the anode gas discharge passage 135 to the cathode gas discharge passage 122.

When a purge control is executed by opening the purge valve 137, the anode off-gas is discharged to outside through the anode gas discharge passage 135 and the cathode gas discharge passage 122. At this time, the anode off-gas is mixed with the cathode off-gas in the cathode gas discharge passage 122. By mixing the anode off-gas and the cathode off-gas and discharging them to outside in this way, a hydrogen concentration in discharged gas is set at a value not larger than a discharge allowable concentration.

The anode gas supplying/discharging device 130 further includes an ejector 138, a reflex passage 139 and a reflux pump 139A to reflux the anode off-gas to the anode gas supply passage 132.

The ejector 138 is provided between the anode pressure control valve 133 and the anode pressure sensor 144 in the anode gas supply passage 132.

The reflux passage 139 is a passage for introducing the anode off-gas in the anode gas discharge passage 135 to the anode gas supply passage 132. One end of the reflux passage 139 is connected to the buffer tank 136 in the anode gas discharge passage 135 and the other end is connected to the ejector 138 in the anode gas supply passage 132.

The reflux pump 139A is provided in the reflux passage 139. The reflux pump 139A is driven if necessary and feeds the anode off-gas discharged from the fuel cell stack 110 under pressure from the anode gas discharge passage 135 toward the anode gas supply passage 132.

The anode pressure sensor 144 is provided downstream of the anode pressure control valve 133 in the anode gas supply passage 132. The anode pressure sensor 144 is arranged near the anode gas inlet part of the fuel cell stack 110. The anode pressure sensor 144 detects a pressure of the anode gas to be supplied to the fuel cell stack 110 (=pressure of the anode gas as the working fluid to be supplied to the turbine 30 to be described later).

The fuel cell system 100 configured as described above includes the controller 140 as a control device configured to integrally control this system.

The controller 140 is configured by a microcomputer including a central processing unit (CPU), a read-only memory (ROM), a random access memory (RAM) and an input/output interface (I/O interface).

To the controller 140 are input signals from various sensors configured to detect an operating state of the fuel cell system 100 such as a voltage sensor 145 configured to detect an output voltage of the fuel cell stack 110, a current sensor 146 configured to detect an output current of the fuel cell stack 110 and an accelerator stroke sensor 147 configured to detect a depressed amount of an accelerator pedal of a vehicle besides signals from various sensors described above such as the cathode pressure sensor 141.

The controller 140 controls the cathode gas supplying device 1, the reflux pump 139A, various valves 126, 128, 133, 137 and the like on the basis of detection signals of these sensors and the like.

Figure 3:
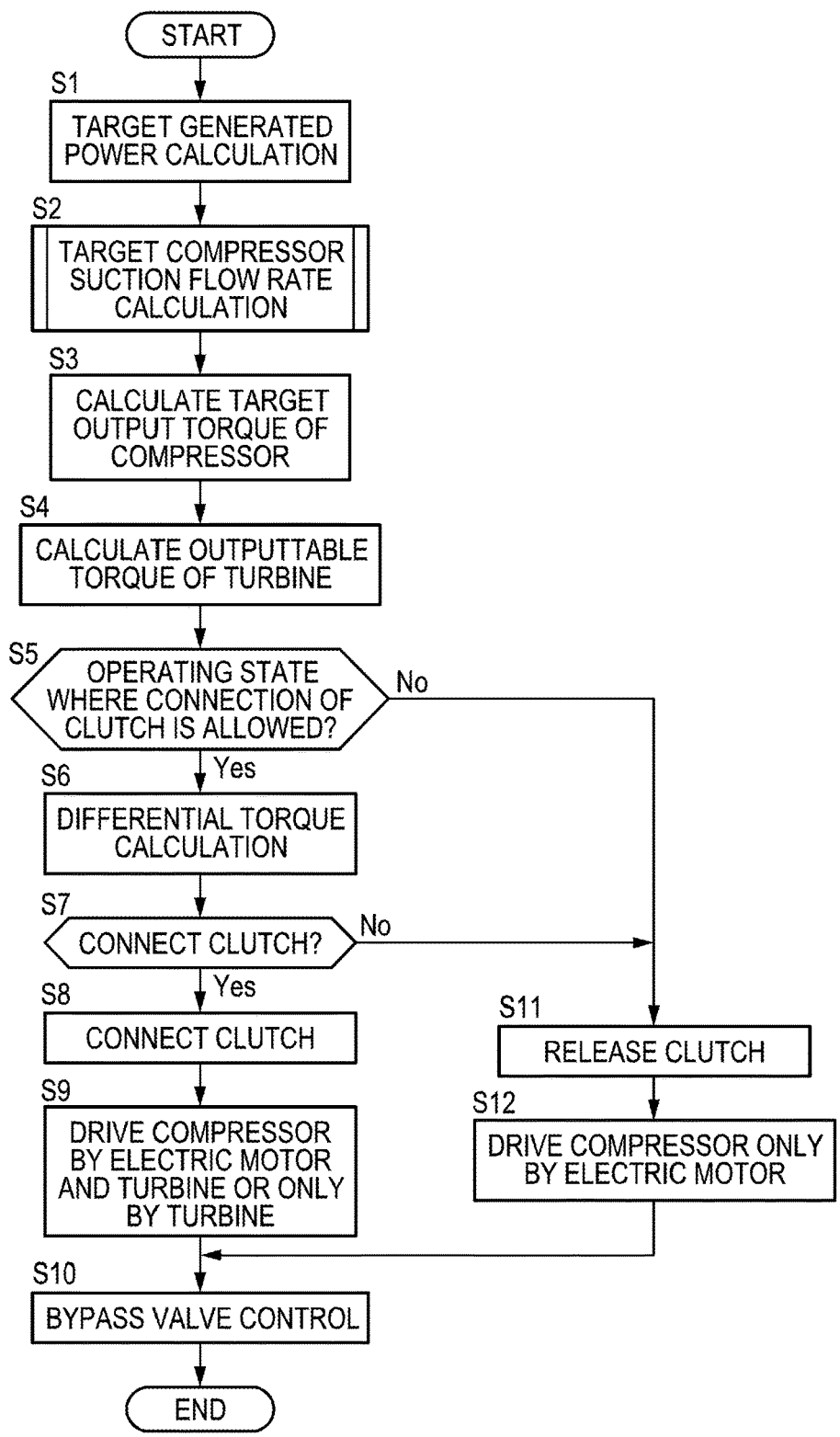
FIG. 3 is a flow chart showing a cathode gas supply control of the fuel cell system according to the first embodiment of the present invention.

A cathode gas supply control of the fuel cell system 100 according to the first embodiment executed by the controller 140 is described below with reference to a flow chart of FIG. 3. The controller 140 repeatedly executes this routine in a predetermined calculation cycle.

In Step S1, the controller 140 calculates target generated power of the fuel cell stack 110 on the basis of required power of a travel motor (not shown) configured to drive the vehicle, required power of auxiliary machines and charge/discharge requests of a battery (not shown).

In Step S2, the controller 140 calculates a target value of the compressor suction flow rate (hereinafter, referred to as a "target compressor suction flow rate") on the basis of the operating state of the fuel cell system 100. A specific calculation method of the target compressor suction flow rate is described with reference to FIG. 4.

Figure 4:
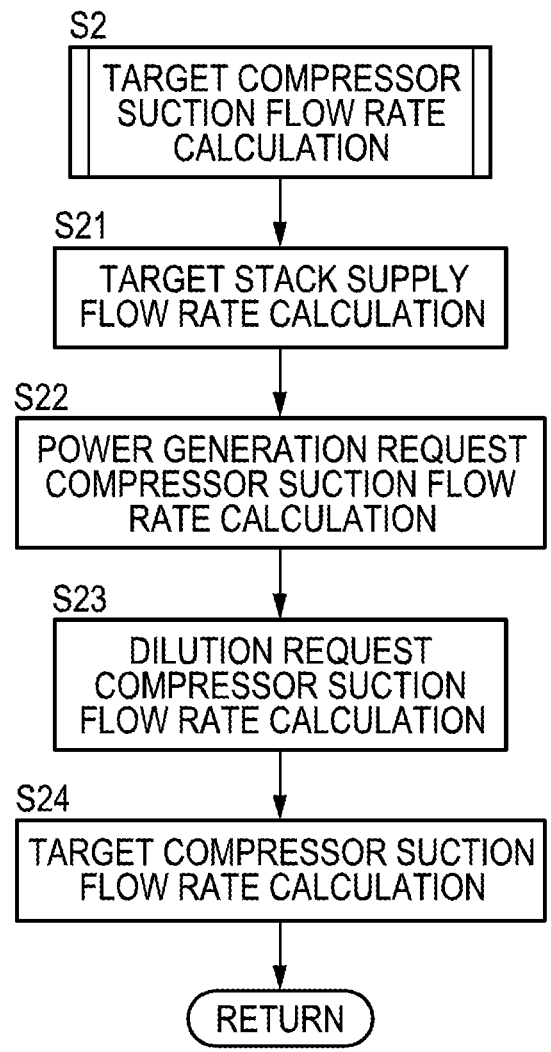
FIG. 4 is a flow chart showing a calculation method of a target compressor suction flow rate.

FIG. 4 is a flow chart showing the calculation method of the target compressor suction flow rate.

In Step S21, the controller 140 calculates a target value of the stack supply flow rate (hereinafter, referred to as a "target stack supply flow rate") on the basis of the target generated power. The target stack supply flow rate corresponds to a stack supply flow rate necessary to ensure an oxygen partial pressure necessary for the electrode reaction in cathode electrodes of the fuel cell stack 110 when the target generated power is generated. In other words, the target stack supply flow rate corresponds to a stack supply flow rate necessary to generate the target generated power. The larger the target generated power, the larger the target stack supply flow rate.

In Step S22, the controller 140 calculates a compressor suction flow rate necessary for the detected stack supply flow rate to reach the target stack supply flow rate as a power generation request compressor suction flow rate on the basis of a deviation between the detected stack supply flow rate and the target stack supply flow rate.

In Step S23, the controller 140 calculates a dilution request compressor suction flow rate on the basis of the target generated power. The dilution request compressor suction flow rate is a compressor suction flow rate necessary to set the hydrogen concentration of the discharged gas to be discharged to the outside of the fuel cell system 100 to or below the discharge allowable concentration. In the present embodiment, the larger the target generated power, the larger the dilution request compressor suction flow rate. However, the dilution request compressor suction flow rate may be a fixed value regardless of the target generated power.

In Step S24, the controller 140 calculates the target compressor suction flow rate on the basis of the power generation request compressor suction flow rate and the dilution request compressor suction flow rate. Specifically, the larger one of the power generation request compressor suction flow rate and the dilution request compressor suction flow rate is calculated as the target compressor suction flow rate to satisfy both a power generation request and a dilution request. It should be noted that although the larger one of the power generation request compressor suction flow rate and the dilution request compressor suction flow rate is calculated as the target compressor suction flow rate in the present embodiment, the largest one of a cathode gas flow rate necessary to avoid a surge in the compressor 10 (surge request compressor suction flow rate) and the above two request compressor suction flow rates may be, for example, calculated as the target compressor suction flow rate.

Referring back to FIG. 3, in Step S3, the controller 140 calculates a target output torque of the compressor 10 on the basis of the target compressor suction flow rate that changes according to the operating state of the fuel cell system 100. The target output torque of the compressor 10 corresponds to an output torque of the compressor 10 necessary for the detected compressor suction flow rate to reach the target compressor suction flow rate.

In Step S4, the controller 140 calculates an outputtable torque of the turbine 30 on the basis of the amount of energy of the anode gas as the working fluid to be supplied from the high-pressure tank 131 to the turbine 30. Specifically, as shown in a table of FIG. 5, the outputtable torque of the turbine 30 is calculated on the basis of the pressure of the anode gas as the working fluid to be supplied to the turbine 30. Examples of a parameter correlated with the amount of energy of the anode gas include a flow rate besides the pressure. Thus, the outputtable torque of the turbine 30 can also be calculated on the basis of the flow rate of the anode gas.

It should be noted that the pressure of the anode gas as the working fluid to be supplied to the turbine 30, i.e. the pressure of the anode gas to be supplied to the fuel cell stack 110 is controlled on the basis of the operating state of the fuel cell system 100 (or the fuel cell stack 110). Specifically, the controller 140 controls an opening degree of the anode pressure control valve 133 on the basis of the operating state of the fuel cell system 100 such that the pressure of the anode gas to be supplied to the fuel cell stack 110 is not lower than the pressure of the cathode gas to be supplied to the fuel cell stack 110.

In Step S5, the controller 140 determines whether or not an operating state where the connection of the clutch 40 is allowed is set. In the present embodiment, the controller 140 proceeds to a processing of Step S11, assuming an operating state where the connection of the clutch 40 is not allowed, in the case of an operating state where the anode gas is not supplied to the fuel cell stack 110 by a request of the fuel cell system 100 (or the fuel cell stack 110), e.g. in the case of an operating state where only the cathode gas is supplied to the fuel cell stack 110 during an idle stop control. Further, only the cathode gas is supplied to reliably dilute hydrogen in an initial stage during starting of the fuel cell system 100 (or the fuel cell stack 110) and the anode gas is supplied from a late stage during starting. Thus, an advance is made to the processing of Step S11 without allowing the connection of the clutch 40 also in this case. Further, only the cathode gas is supplied also in a late stage during stopping of the fuel cell system 100 (or the fuel cell stack 110). Thus, an advance is made to the processing of Step S11 without allowing the connection of the clutch 40 also in this case. As just described, the controller 140 proceeds to the processing of Step S11, assuming the operating state where the connection of the clutch 40 is not allowed, in the case of the operating state where only the cathode gas is supplied to the fuel cell stack 110 such as in the initial stage during starting the system, in the late stage during the stopping system and during the idle stop controlling. On the other hand, the controller 140 proceeds to a processing of Step S6, assuming the operating state where the connection of the clutch 40 is allowed, in the case of a normal operating state where the anode gas is supplied to the fuel cell stack 110. In this way, the controller 140 controls the clutch 40 on the basis of the state of the anode gas serving as the power source of the turbine 30.

It should be noted that the operating state where the anode gas is not supplied to the fuel cell stack 110 is, in other words, an operating state where the outputtable torque of the turbine 30 is zero and an operating state where the turbine 30 is not rotating. Thus, if the operating state where the connection of the clutch 40 is not allowed is determined in Step S5, an advance may be directly made to Step S12 without setting the clutch 40 in a released state. However, since the turbine 30 acts as a load of the electric motor 20 in this case, it is desirable to set the clutch 40 in the released state as in the present embodiment.

In Step S6, the controller 140 calculates a differential torque obtained by subtracting the outputtable torque of the turbine 30 from the target output torque of the compressor 10.

In Step S7, the controller 140 determines whether or not to connect the clutch 40. Specifically, it is determined whether or not the differential torque is smaller than a predetermined clutch connection threshold value (predetermined threshold value).

The controller 140 proceeds to a processing of Step S8 to drive the compressor 10 by the electric motor 20 and the turbine 30 with the clutch 40 set in a connected state or drive the compressor 10 only by the turbine 30 if the differential torque is smaller than the clutch connection threshold value. On the other hand, the controller 140 proceeds to the processing of Step S11 to drive the compressor 10 only by the electric motor 20 with the clutch 40 set in the released state if the differential torque is not smaller than the clutch connection threshold value.

The compressor 10 is driven only by the electric motor 20 when the differential torque is not smaller than the clutch connection threshold value for the following reason. Specifically, the differential torque is not smaller than the clutch connection threshold value, for example, before the pressure of the anode gas sufficiently increases and when the outputtable torque of the turbine 30 is small such as immediately after the start of the supply of the anode gas to the fuel cell stack 110. This is because, since motive power obtained by the turbine 30 is small in such a case, the cathode gas can be stably supplied by driving the compressor 10 only by the electric motor 20.

Further, the differential torque is not smaller than the clutch connection threshold value, for example, when the target output torque of the compressor 10 transiently suddenly increases and the outputtable torque of the turbine 30 becomes smaller with respect to the target output torque of the compressor 10 such as during sudden acceleration. This is because the output torque of the compressor 10 can be quickly and accurately controlled to the target output torque and control performance in transient time can be improved by driving the compressor 10 only by the electric motor 20 excellent in responsiveness and controllability in such a case.

As just described, in the present embodiment, a switch is made to the drive of the compressor 10 only by the electric motor 20, that only by the turbine 30 or that by the electric motor 20 and the turbine 30 according to the differential torque. Here, the differential torque changes according to a state (pressure or flow rate) of the anode gas serving as the power source.

That is, in the present embodiment, the drive of the compressor 10 by either one or both of the electric motor 20 and the turbine 30 can be selected according to the state of the anode gas serving as the power source and the compressor 10 can be driven by a suitable driving source corresponding to the operating state of the fuel cell system 100 (or the fuel cell stack 110). The aforementioned clutch connection threshold value may be appropriately set such that the compressor 10 can be driven by a suitable driving source corresponding to the operating state of the fuel cell system 100.

In Step S8, the controller 140 sets the clutch 40 in the connected state.

In Step S9, the controller 140 drives the compressor 10 by the electric motor 20 and the turbine 30 or only by the turbine 30 by controlling the output torque of the electric motor 20 according to the outputtable torque of the turbine 30 determined on the basis of the pressure or flow rate of the anode gas.

Specifically, the controller 140 sets the target output torque of the electric motor 20 as the differential torque and drives the compressor 10 by the electric motor 20 and the turbine 30 if the differential torque calculated in Step S6 is larger than zero (if the outputtable torque is smaller than the target output torque). Specifically, the differential torque is generated by the electric motor 20 and the outputtable torque is generated by the turbine 30, whereby the output torque of the compressor 10 is controlled to the target output torque calculated in Step S3. Examples of the operating state where the compressor 10 is driven by the electric motor 20 and the turbine 30 in this way include an operating state where the fuel cell stack 110 is steadily operated at a high load.

On the other hand, the controller 140 sets the target output torque of the electric motor 20 to zero and drives the compressor 10 only by the turbine 30 if the differential torque calculated in Step S6 is not larger than zero (if the outputtable torque is not smaller than the target output torque). Examples of the operating state where the compressor 10 is driven only by the turbine 30 in this way include an operating state where the fuel cell stack 110 is steadily operated at a low load.

It should be noted that, in the case of driving the compressor 10 only by the turbine 30, the compressor 10 is driven by a torque not smaller than the target output torque of the compressor 10 calculated in Step S3 (=outputtable torque). Thus, the compressor suction flow rate becomes equal to or larger than the target compressor suction flow rate. However, excess cathode gas unnecessary for the fuel cell stack 110 is flowed to the bypass passage 127 by a bypass valve control in the following Step S10 so that no problem occurs.

In Step S10, the controller 140 feedback-controls the bypass valve 128 such that the detected stack supply flow rate reaches the target stack supply flow rate on the basis of a deviation between the detected stack supply flow rate and the target stack supply flow rate.

The cathode gas is discharged from the compressor 10 at a flow rate not smaller than a stack request compressor suction flow rate such as when the compressor 10 is driven only by the turbine 30 or when the dilution request compressor suction flow rate is not set as the target compressor suction flow rate. Thus, excess cathode gas unnecessary for power generation is supplied to the fuel cell stack 110. Therefore, by feedback-controlling the bypass valve 128 such that the detected stack supply flow rate reaches the target stack supply flow rate, excess cathode gas unnecessary for power generation is flowed to the bypass passage 127.

In Step S11, the controller 140 sets the clutch 40 in the released state.

In Step S12, the controller 140 sets the target output torque of the electric motor 20 to the target output torque of the compressor 10 calculated in Step S3 and drives the compressor 10 only by the electric motor 20. Examples of the operating state where the differential torque is not smaller than the clutch connection threshold value in this way include an operating state where the outputtable torque of the turbine 30 is small with respect to the target output torque of the compressor 10 before the pressure of the anode gas sufficiently increases such as immediately after the start of the supply of the anode gas to the fuel cell stack 110 and an operating state where the target output torque of the compressor 10 transiently suddenly increases and the outputtable torque of the turbine 30 becomes smaller with respect to the target output torque of the compressor 10 such as during sudden acceleration.

As just described, the controller 140 controls the pressure or flow rate of the anode gas serving as the power source of the turbine 30 according to the operating state of the fuel cell system 100 and selects the driving source for driving the compressor 10 on the basis of the pressure or flow rate of the anode gas. Specifically, the driving source for driving the compressor 10 is selected by controlling the clutch 40 and controlling the output of the electric motor 20 on the basis of the pressure or flow rate of the anode gas serving as the power source of the turbine 30.

Specifically, the controller 140 calculates the target output torque of the compressor 10 on the basis of the operating state of the fuel cell system 100, calculates the outputtable torque of the turbine 30 on the basis of the pressure or flow rate of the anode gas as the working fluid, and controls the clutch 40 and controls the output of the electric motor 20 on the basis of the target output torque of the compressor 10 and the outputtable torque of the turbine 30.

Specifically, the controller 140 sets the clutch 40 in the connected state, controls the output torque of the electric motor 20 to zero and drives the compressor 10 only by the output of the turbine 30 when the outputtable torque of the turbine 30 is not smaller than the target output torque of the compressor 10 (differential torque ≤0).

Further, the controller 140 controls the output torque of the electric motor 20 to the target output torque and drives the compressor 10 only by the output of the electric motor 20 when the outputtable torque of the turbine is zero. In this case, the clutch 40 may be set in the released state or in the connected state. Further, the controller 140 sets the clutch 40 in the released state, controls the output torque of the electric motor 20 to the target output torque and drives the compressor 10 only by the output of the electric motor 20 when the differential torque obtained by subtracting the outputtable torque of the turbine 30 from the target output torque of the compressor 10 is not smaller than the clutch connection threshold value.

Furthermore, the controller 140 sets the clutch 40 in the connected state and drives the compressor 10 by the output of the electric motor 20 and the output of the turbine 30 when the outputtable torque of the turbine 30 is smaller than the target output torque of the compressor (differential torque >0).

According to the present embodiment described above, the following effects can be obtained.

The control device for fuel cell according to the present embodiment includes the compressor 10 configured to supply the cathode gas to the fuel cell stack 110, the driving device 11 including at least two compressor driving sources including the electric motor 20 as a drive motor and the turbine 30 as a driving body using a power source other than the drive motor and configured to drive the compressor 10 by these compressor driving sources and the controller 140 as a control unit, and the controller 140 controls the state (pressure or flow rate) of the anode gas serving as the power source on the basis of the operating state of the fuel cell system 100 and selects the driving source to be used out of the compressor driving sources on the basis of the state of the anode gas.

Thus, according to the present embodiment, the compressor 10 can be driven by driving the electric motor 20 and the turbine 30 at a suitable power ratio corresponding to the state of the power source. Therefore, a burden of the electric motor 20 in driving the compressor 10 can be reduced and the miniaturization of the electric motor 20 and, eventually, the miniaturization of the cathode gas supplying device 1 can be realized.

Further, according to the present embodiment, the driving device 11 includes the clutch 40 on the output rotary shaft 24 as a power transmission path and the drive force of the turbine 30 as the driving body is transmitted to the compressor 10 in the power transmission path. The controller 140 controls the clutch 40 and controls the electric motor 20 on the basis of the state of the anode gas serving as the power source. Thus, the compressor 10 can be driven utilizing the drive force of the electric motor 20 while the turbine 30 is driven effectively utilizing the energy of the anode gas.

Thus, power performance required for the electric motor 20 to drive the compressor 10 can be suppressed, for example, as compared to such a cathode gas supplying device as to drive a compressor only by an electric motor. Therefore, the miniaturization of the electric motor 20 and, eventually, the miniaturization of the cathode gas supplying device 1 can be realized. Further, manufacturing cost of the cathode gas supplying device 1 can be reduced by miniaturizing the electric motor 20.

Further, the compressor 10 can be driven by the electric motor 20 excellent in responsiveness and controllability according to the operating state of the fuel cell system 100 or the fuel cell stack 110. Thus, the cathode gas flow rate can be precisely controlled, for example, as compared to such a cathode gas supplying device as to drive a compressor only by anode gas supplied from a high-pressure tank to a fuel cell stack. Further, the compressor 10 can be driven by the electric motor 20 even in an operating state where the anode gas is not supplied from the high-pressure tank 131 to the fuel cell stack 110.

Further, according to the present embodiment, the controller 140 releases the clutch 40 and drives the compressor 10 only by the electric motor 20 when the operating state where the anode gas is not supplied to the fuel cell stack 110 is set due to a request of the fuel cell system 100 or the fuel cell stack 110 such as during an idle stop control. Thus, the turbine 30 can be prevented from acting as a load of the electric motor 20 during the idle stop control.

Further, according to the present embodiment, the controller 140 releases the clutch 40 and drives the compressor 10 only by the electric motor 20 in the initial stage during starting of the fuel cell system 100 or the fuel cell stack 110 or in the late stage during stopping the fuel cell system 100 or the fuel cell stack 110. Thus, in the initial stage during starting of the fuel cell system 100, the cathode gas can be supplied by driving the compressor 10 only by the electric motor 20 without supplying the anode gas, wherefore it can be prevented that hydrogen is insufficiently diluted in the initial state during the start. Further, the turbine 30 can be prevented from acting as a load of the electric motor 20. Furthermore, the turbine 30 can be prevented from acting as a load of the electric motor 20 also in the late stage during starting.

Further, according to the present embodiment, high-pressure anode gas can be effectively utilized and energy efficiency in the fuel cell system 100 can be enhanced since the anode gas to be supplied to the fuel cell stack 110 is used as the power source of the turbine 30. Since the temperature of the anode gas decreases when the anode gas is discharged from the high-pressure tank 131, the anode gas having a relatively low temperature is supplied to the turbine 30 and temperature increases of components around the turbine 30 of the cathode gas supplying device 1 can be suppressed.

Further, in the present embodiment, the controller 140 controls the output torque of the electric motor 20 to zero and drives the compressor 10 only by the output of the turbine 30 when the outputtable torque of the turbine 30 is not smaller than the target output torque of the compressor 10 (differential torque ≤0). By driving the compressor 10 only by the turbine 30 in this way when the outputtable torque of the turbine 30 is not smaller than the target output torque of the compressor 10, the power consumption of the electric motor 20 can be suppressed by effectively utilizing the energy of the anode gas.

Further, in the present embodiment, the controller 140 controls the output torque of the electric motor 20 to the target output torque and drives the compressor 10 only by the output of the electric motor 20 when the outputtable torque of the turbine 30 is zero. Thus, even in the operating state where the anode gas is not supplied from the working fluid supplying device 50, the output of the compressor 10 can be controlled to the target output torque by driving the compressor 10 by the electric motor 20.

Further, in the present embodiment, the controller 140 sets the clutch 40 in the released state, controls the output torque of the electric motor 20 to the target output torque and drives the compressor 10 only by the output of the electric motor 20 when the differential torque obtained by subtracting the outputtable torque of the turbine 30 from the target output torque of the compressor 10 is not smaller than the clutch connection threshold value (predetermined threshold value). In this way, the output torque of the compressor 10 can be quickly and accurately controlled to the target output torque by the electric motor 20 excellent in responsiveness and controllability even when the output of the turbine 30 is in shortage or when the target output torque of the compressor 10 transiently suddenly increases such as during sudden acceleration. Further, since the clutch 40 is set in the released state, the turbine 30 does not act as a load of the electric motor 20, wherefore the compressor 10 can be controlled by the electric motor 20 with better responsiveness.

Further, in the present embodiment, the controller 140 drives the compressor 10 by the output of the electric motor 20 and the output of the turbine 30 when the outputtable torque of the turbine 30 is smaller than the target output torque of the compressor 10 (differential torque >0). Since the output torque required for the electric motor 20 in driving the compressor 10 can be suppressed more in this way than in the case of driving the compressor 10 only by the electric motor 20, the power consumption of the electric motor 20 can be suppressed.

Figure 5:
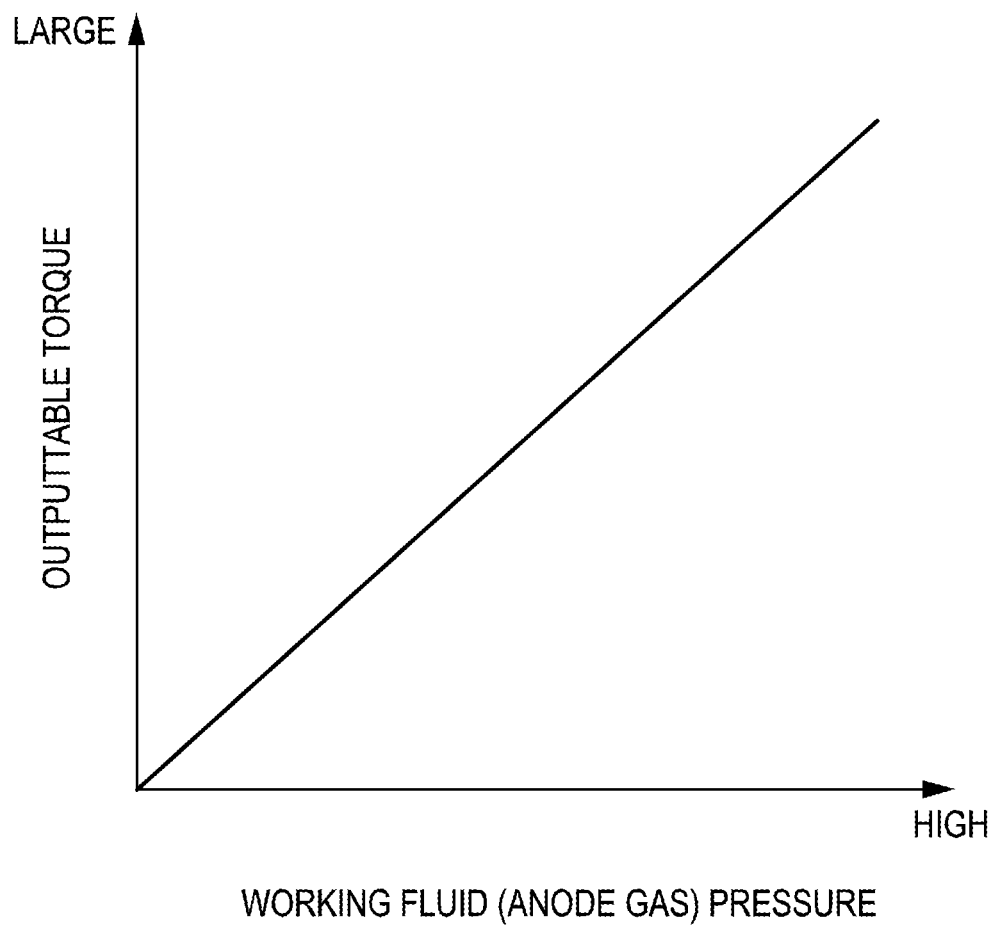
FIG. 5 is a table for calculating an outputtable torque of a turbine on the basis of a pressure of anode gas as working fluid.
Figure 6:
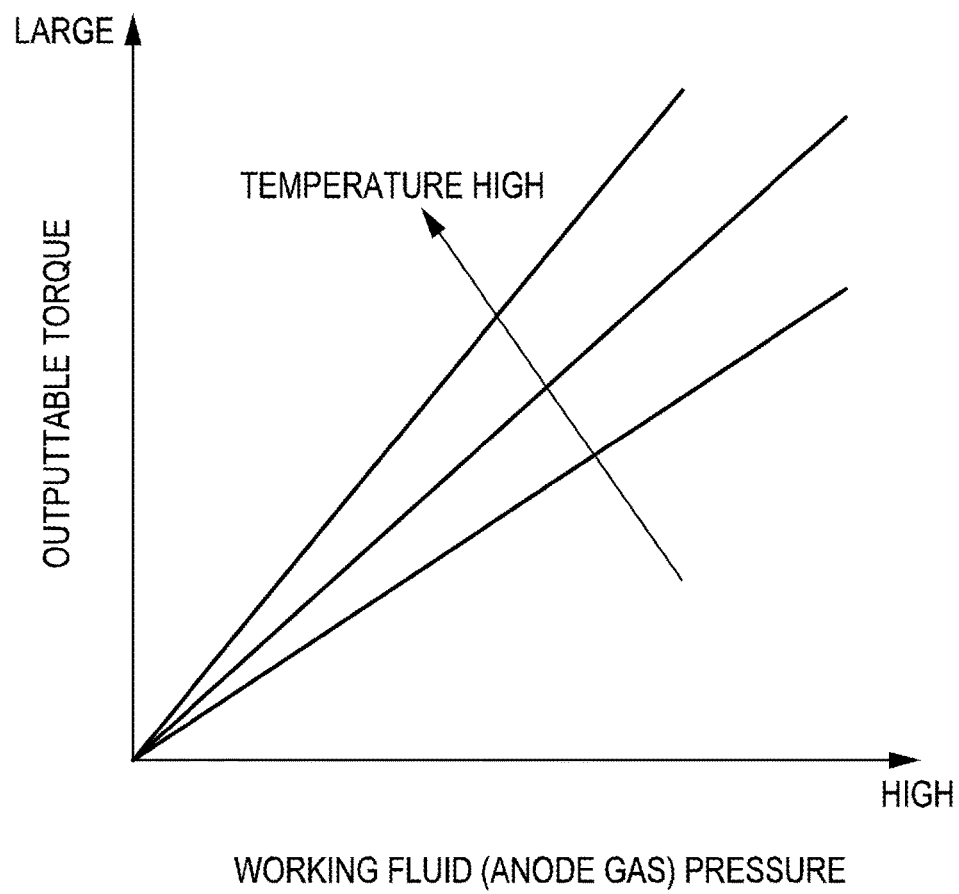
FIG. 6 is a map for calculating the outputtable torque of the turbine on the basis of the pressure and temperature of the anode gas as the working fluid.

It should be noted that although the outputtable torque of the turbine 30 is calculated on the basis of the pressure of the anode gas with reference to the table of FIG. 5 in the present embodiment, the outputtable torque of the turbine 30 can also be calculated on the basis of the pressure and temperature of the anode gas with reference to a map shown in FIG. 6. The temperature of the anode gas may be detected, for example, by providing a temperature sensor in a part of the anode gas supply passage 132 between the high-pressure tank 131 and the turbine 30. As the temperature of the anode gas increases, a density of the anode gas increases and the amount of energy of the anode gas as the working fluid also increases. Thus, the outputtable torque of the turbine 30 can be accurately calculated by making such a correction that the outputtable torque of the turbine 30 increases as the temperature increases as shown in the map of FIG. 6.

Further, in the present embodiment, the output torque of the compressor 10 is the outputtable torque of the turbine 30 larger than the target output torque when the compressor 10 is driven only by the turbine 30. Thus, the compressor suction flow rate is larger than the target compressor suction flow rate. Accordingly, when the compressor 10 is driven only by the turbine 30, a transmission torque capacity of the clutch 40 can be controlled, for example, by setting the clutch 40 in a half-clutch state so that the output torque of the compressor 10 reaches the target output torque. Specifically, the transmission torque capacity of the clutch 40 is feedback-controlled such that the compressor suction flow rate reaches the target compressor suction flow rate.

Here, when the fuel cell stack 110 is steadily operated at a low load, a switch may be made to an operating state where the cathode gas is intermittently supplied by cyclically increasing and decreasing the target compressor suction flow rate (pressure of the cathode gas) to remove water pooled on the cathode side in the fuel cell stack 110 while the anode gas is supplied at a constant pressure.

Thus, if the transmission torque capacity of the clutch 40 is so controlled that the output torque of the compressor 10 reaches the target output torque when the fuel cell stack 110 is steadily operated at a low load and, for example, the operating state where the compressor 10 can be driven only by the turbine 30 is set, the compressor suction flow rate can be controlled to the target compressor suction flow rate even in the case of driving the compressor 10 only by the turbine 30.

If the cathode gas is intermittently supplied to the fuel cell stack 110 by engaging and releasing the clutch 40 in this way when the operating state where the cathode gas is intermittently supplied while the anode gas is supplied to the fuel cell stack 110 is set, the compressor suction flow rate can be controlled to the target compressor suction flow rate only by the turbine 30 without driving the electric motor 20 even if the target compressor suction flow rate cyclically increases and decreases. Thus, the power consumption of the electric motor 20 can be suppressed while the target compressor suction flow rate is realized.

Further, although the electric motor 20 and the turbine 30 are connected via the clutch 40 in the present embodiment, the clutch 40 needs not necessarily be provided. If the clutch 40 is not provided, the compressor 10 may be driven only by the turbine 30 when the differential torque is not larger than zero and the compressor 10 may be driven by the electric motor 20 and the turbine 30 when the differential torque is larger than zero. Effects similar to the above can be obtained also in this way.

Further, although the clutch 40 and the electric motor 20 are controlled on the basis of the state of the anode gas serving as the power source in the present embodiment, the electric motor 20 and the clutch 40 may be controlled as follows. Specifically, the electric motor 20 may be controlled on the basis of the operating state of the fuel cell system 100 and the clutch 40 may be controlled on the basis of the state of the anode gas serving as the power source to compensate for the drive force of the electric motor 20 by the drive force of the turbine 30.

If the electric motor 20 is miniaturized, it may not be possible to give the target output torque of the compressor 10 corresponding to the operating state of the fuel cell system 100 only by the drive force of the electric motor 20. In such a case, the clutch 40 may be controlled on the basis of the state of the anode gas serving as the power source to compensate for the drive force of the electric motor 20 by the drive force of the turbine 30. The clutch 40 may be merely set in the connected state or the transmission torque capacity of the clutch 40 may be controlled, for example, with the clutch 40 set in the half-clutch state so that the output torque of the compressor 10 reaches the target output torque. Specifically, the transmission torque capacity of the clutch 40 may be feedback-controlled such that the compressor suction flow rate reaches the target compressor suction flow rate.

Second Embodiment

Next, a second embodiment of the present invention is described with reference to FIGS. 7 and 8. It should be noted that, in the following embodiment, components and the like fulfilling the same functions as in the first embodiment are denoted by the same reference signs and repeated description is omitted as appropriate.

Figure 7:
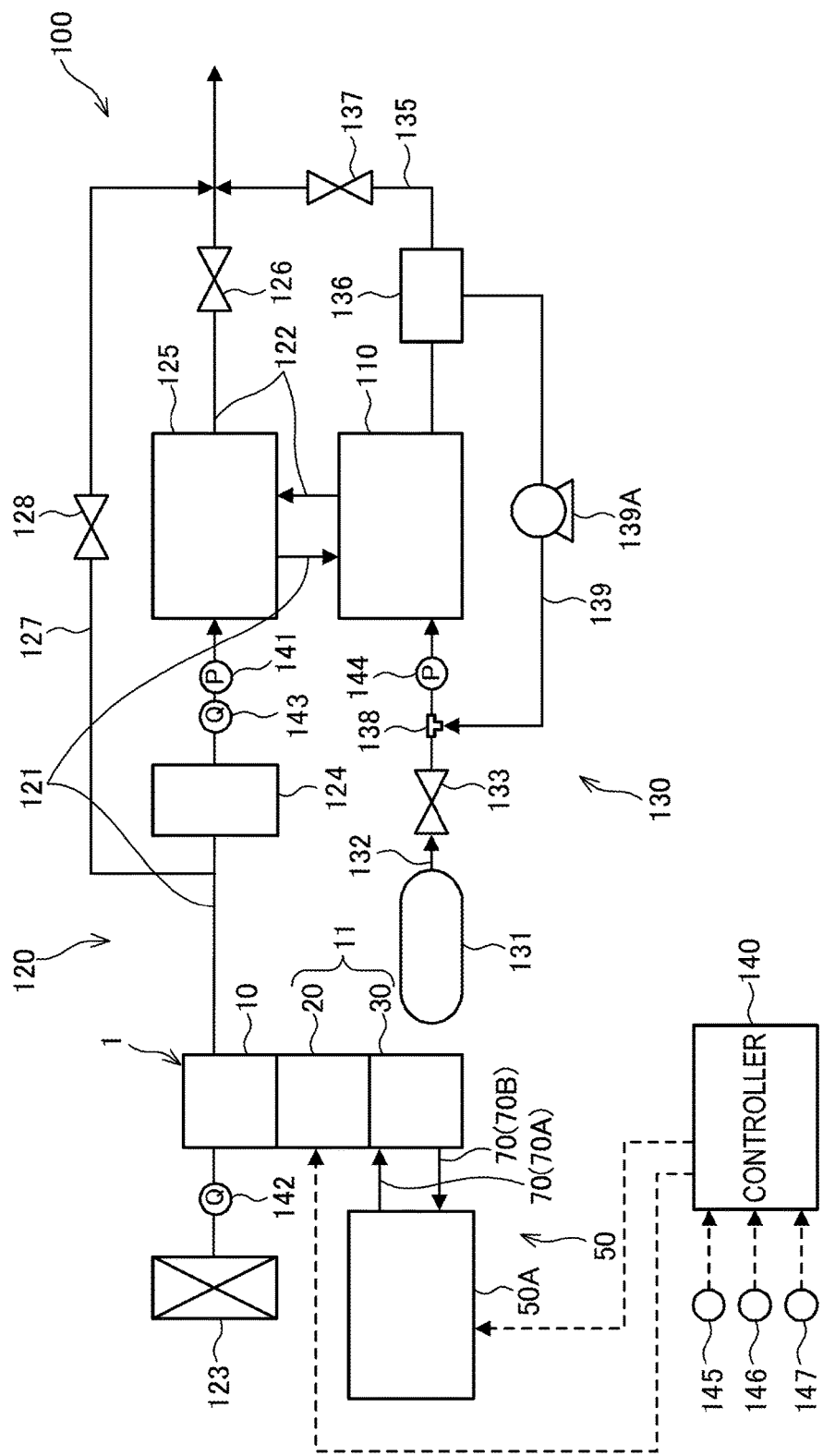
FIG. 7 is a schematic configuration diagram of a fuel cell system according to a second embodiment of the present invention.

FIG. 7 is a schematic configuration diagram of a fuel cell system 100 for vehicle according to the second embodiment of the present invention.

As shown in FIG. 7, a working fluid supplying device 50 of the fuel cell system 100 according to the present embodiment is configured to drive a turbine 30 by supplying working fluid different from anode gas to the turbine 30. In the present embodiment, an air conditioner 50A configured to adjust indoor temperature such as in a vehicle mounted with the fuel cell system 100 is utilized as the working fluid supplying device 50.

Figure 8:
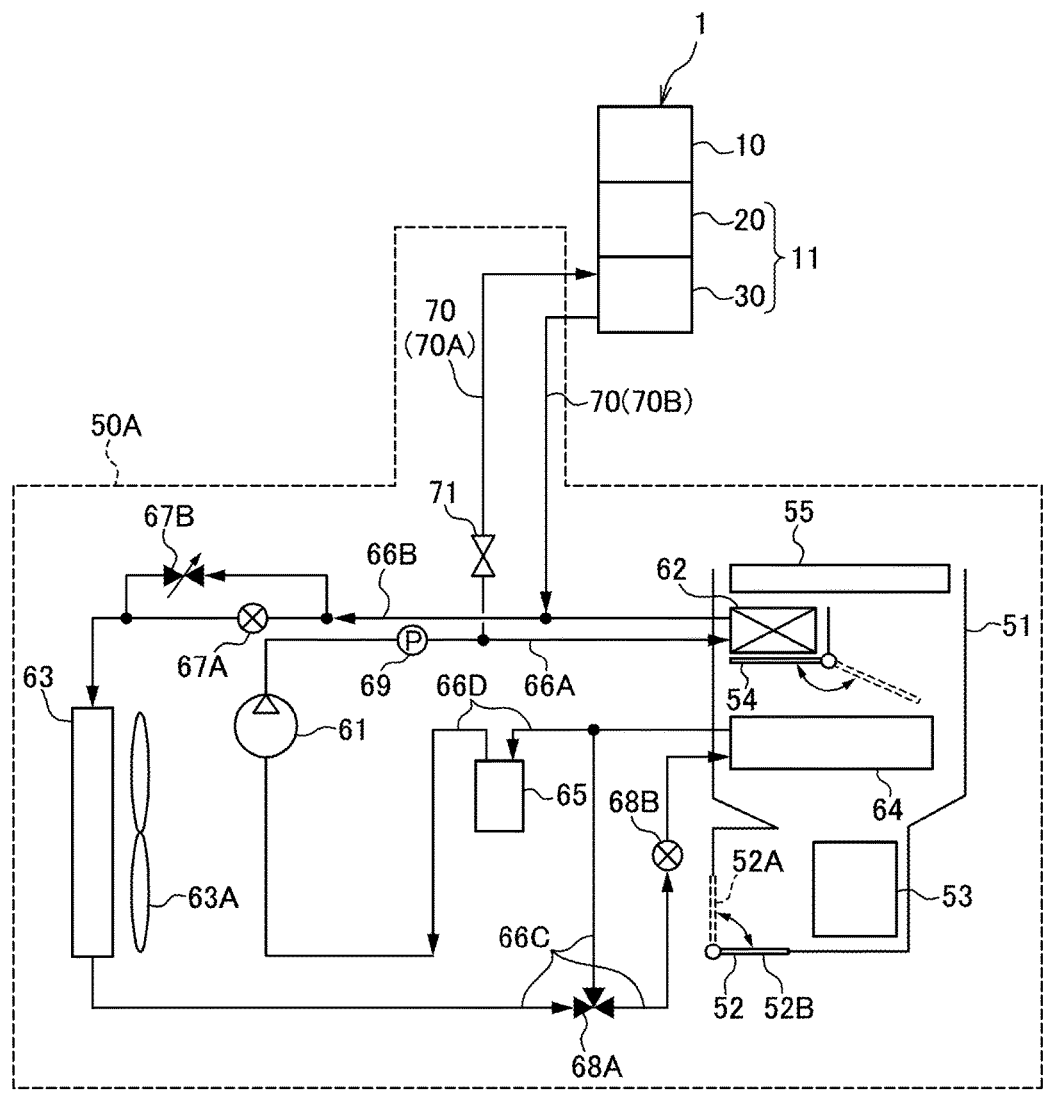
FIG. 8 is a schematic configuration diagram of a fluid supplying device according to the second embodiment of the present invention.

FIG. 8 is a schematic configuration diagram of the air conditioner 50A.

As shown in FIG. 8, the air conditioner 50A includes an air conditioning duct 51 serving as a passage for introducing temperature-adjusted air into a vehicle cabin, an intake door 52, a blower 53 and an air mix door 54. Further, the air conditioner 50A includes a refrigerant compressor 61, an indoor condenser 62, an outdoor heat exchanger 63, an evaporator 64 and an accumulator 65 as devices for heating/cooling air in the air conditioning duct 51, and pipings 66A to 66D connecting these devices such that refrigerant can be circulated.

The intake door 52 is for switching air to be introduced into the air conditioning duct 51 to either one of indoor air (internal air) or outdoor air (external air). The intake door 52 has the position thereof controlled by a controller 140, closes an external air introduction port 52A when indoor air is introduced and closes an internal air introduction port 52B when outdoor air is introduced.

The blower 53 blows air sucked via the external air introduction port 52A or the internal air introduction port 52B toward the vehicle cabin.

The air mix door 54 is for switching the flow of air in the air conditioning duct 51 between during cooling and during heating. The air mix door 54 has the position thereof controlled by the controller 140. The air mix door 54 is controlled to a position (position of solid line in FIG. 8) facing the front surface of the indoor condenser 62 during cooling so that air does not flow into the indoor condenser 62 to be described later. On the other hand, the air mix door 54 is controlled to a position (position of broken line in FIG. 8) not facing the front surface of the indoor condenser 62 during heating so that air flows into the indoor condenser.

The refrigerant compressor 61 sucks and compresses the refrigerant in the piping 66D and discharges the refrigerant having a high temperature and a high pressure to the piping 66A. A refrigerant pressure sensor 69 configured to detect a pressure of the refrigerant discharged from the refrigerant compressor 61 is provided in the piping 66A.

The indoor condenser 62 is arranged in the air conditioning duct 51. The indoor condenser 62 functions as a heat exchanger during heating, exchanges heat between the high-temperature, high-pressure refrigerant flowing from the piping 66A and air in the air conditioning duct 51, and heats the air in the air conditioning duct 51. On the other hand, the indoor condenser 62 does not function as a heat exchanger and allows the high-temperature, high-pressure refrigerant flowing from the piping 66A to pass as it is during cooling since the air mix door 54 prevents air from flowing into the indoor condenser 62.

A first expansion valve 67A and an electromagnetic valve 67B arranged in parallel with respect to the first expansion valve 67A are provided in the piping 66B in which the refrigerant having passed through the indoor condenser 62 flows.

The first expansion valve 67A reduces the temperature of the refrigerant by expanding and decompressing the refrigerant.

The electromagnetic valve 67B is controlled to open and close by the controller 140. The electromagnetic valve 67B is closed during heating to switch a flow passage of the refrigerant such that the refrigerant flows in the piping 66B on the side of the first expansion valve 57A. On the other hand, the electromagnetic valve 67B is opened during cooling to switch the flow passage of the refrigerant such that the refrigerant flows in the piping 66B on the side of the electromagnetic valve 57B.

The outdoor heat exchanger 63 exchanges heat between the high-temperature, high-pressure refrigerant flowing from the piping 66B and outdoor air sucked by a condenser fan 63A. The high-temperature, high-pressure refrigerant introduced into the outdoor heat exchanger 63 is cooled by the outdoor heat exchanger 63 and discharged to the piping 66C as the refrigerant having a medium temperature and a high pressure.

A three-way valve 68A and a second expansion valve 68B are provided in the piping 66C.

The three-way valve 68A is for switching the flow passage of the refrigerant and controlled by the controller 140. The three-way valve 68A switches the flow passage of the refrigerant such that the refrigerant flows into the piping 66D during heating. On the other hand, the three-way valve 68A switches the flow passage of the refrigerant such that the refrigerant flows into the evaporator 64 via the second expansion valve 68B during cooling.

The second expansion valve 68B reduces the temperature of the refrigerant by expanding and decompressing the refrigerant. During cooling, the medium-temperature, high-pressure refrigerant flowing in the piping 66C is cooled by the second expansion valve 68B and introduced into the evaporator 64 as the refrigerant having a low temperature and a low pressure.

The evaporator 64 is arranged upstream of the indoor condenser 62 in the air conditioning duct 51. The evaporator 64 exchanges heat between the low-temperature, low-pressure refrigerant flowing from the piping 66C through the second expansion valve 68B and air in the air conditioning duct 51 and cools and humidifies the air in the air conditioning duct 51 during cooling.

The accumulator 65 is provided in the piping 66D in which the refrigerant to be sucked into the refrigerant compressor 61 flows. The accumulator 65 temporarily accumulates excess refrigerant circulating in the pipings 66A to 66D, separates gas and liquid of the refrigerant and causes gaseous refrigerant to be sucked into the refrigerant compressor 61.

As just described, the air conditioner 50A cools air blown from the blower 53 by the evaporator 64 and introduces the cooled air into the vehicle cabin during cooling. On the other hand, the air conditioner 50A heats air blown from the blower 53 by the indoor condenser 62 and, if necessary, heats the air by a PTC heater 55 arranged downstream of the indoor condenser 62 and introduces the heated air into the vehicle cabin during heating.

In the present embodiment, the refrigerant circulating in the pipings 66A to 66D of the air conditioner 50A is used as working fluid for rotationally driving the turbine 30. That is, the refrigerant circulating in the pipings 66A to 66D for air conditioning is used as a power source of the turbine 30. Specifically, the high-pressure refrigerant flowing in the piping 66A is used as the working fluid.

Thus, in the present embodiment, the air conditioner 50A is provided with a piping 70 branched off from the piping 66A, in which the refrigerant having a relatively high pressure flows, and connected to the piping 66B, and the turbine 30 is arranged in the piping 70. The piping 70 is composed of a piping 70A connecting the piping 66A and a suction port of the turbine 30 and a piping 70B connecting a discharge port of the turbine 30 and the piping 66B. A flow rate control valve 71 configured to adjust a flow rate of the refrigerant to be sucked into the turbine 30 is provided in the piping 70A.

Figure 9:
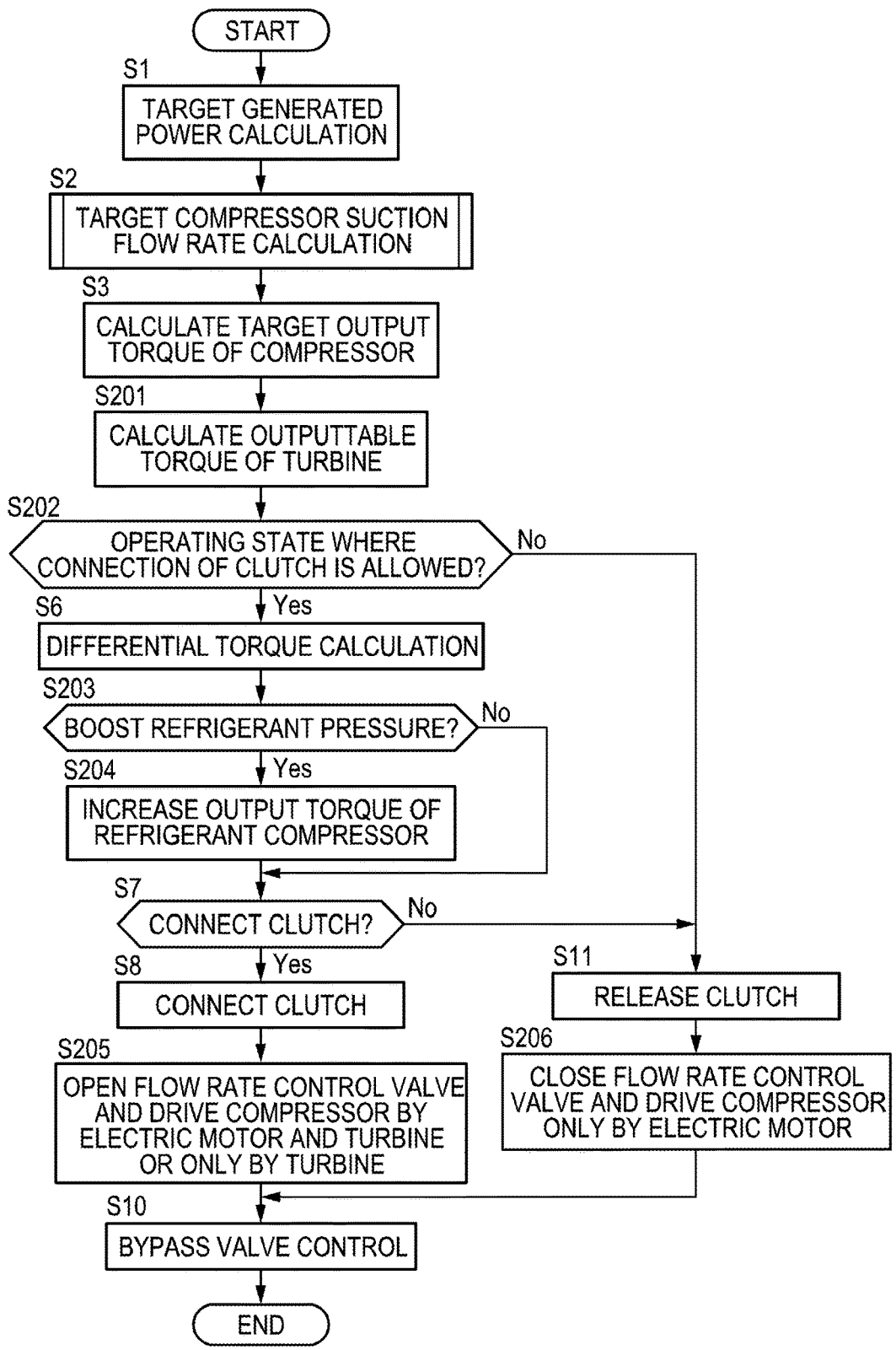
FIG. 9 is a flow chart showing a cathode gas supply control of the fuel cell system according to the second embodiment of the present invention.

A cathode gas supply control of the fuel cell system 100 according to the second embodiment executed by the controller 140 is described below with reference to a flow chart of FIG. 9. Steps in which processings similar to those of the first embodiment are denoted by the same Step numbers as in the first embodiment and not described.

Figure 10:
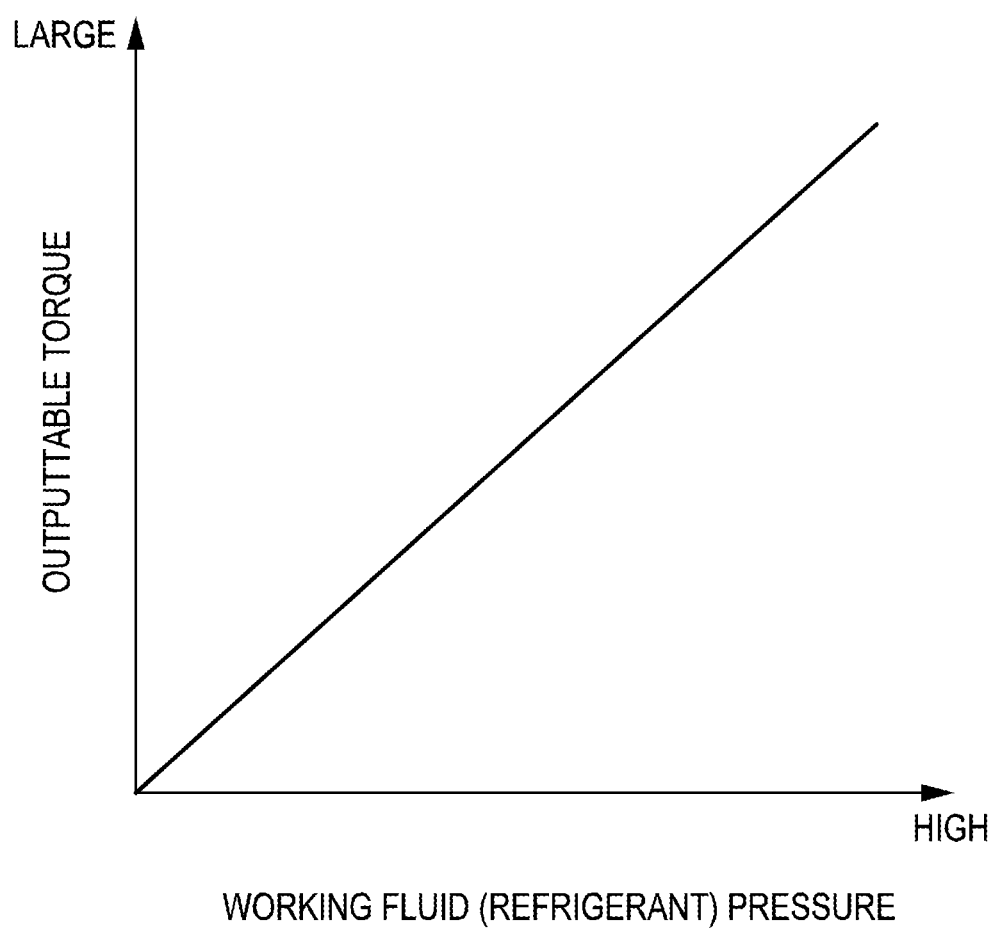
FIG. 10 is a table for calculating an outputtable torque of a turbine on the basis of a pressure of refrigerant as working fluid.

In Step S201, the controller 140 calculates an outputtable torque of the turbine 30 on the basis of the amount of energy of the refrigerant as the working fluid to be supplied to the turbine 30. Specifically, as shown in a table of FIG. 10, the outputtable torque of the turbine 30 is calculated on the basis of the pressure of the refrigerant detected by the refrigerant pressor sensor 69. It should be noted that the outputtable torque of the turbine 30 can also be calculated on the basis of the flow rate of the refrigerant as in the first embodiment.

In Step S202, the controller 140 determines whether or not the connection of a clutch 40 is allowed. In the present embodiment, the controller 140 proceeds to a processing of Step S11 without allowing the connection of the clutch 40 such as when the air conditioner 50A is broken and the refrigerant cannot be circuited. On the other hand, the controller 140 allows the connection of the clutch 40 and proceeds to a processing of Step S6 if the circulation of the refrigerant is possible.

In Step S203, the controller 140 determines whether or not to boost the refrigerant pressure. Specifically, the controller 140 determines whether or not a differential torque is not smaller than a predetermined refrigerant pressure boost threshold value. The refrigerant pressure boost threshold value is a value smaller than a clutch connection threshold value. If the differential torque is not smaller than the refrigerant pressure boost threshold value, the controller 140 proceeds to a processing of Step S204 to boost the refrigerant pressure. On the other hand, the controller 140 proceeds to a processing of Step S7 while keeping the refrigerant pressure as it is if the differential torque is smaller than the refrigerant pressure boost threshold value.

In Step S204, the controller 140 boosts the refrigerant pressure by increasing an output torque of the refrigerant compressor 61 from a normal output torque set by an air conditioning request, thereby increasing the outputtable torque of the turbine 30. In this way, the differential torque is reduced. That is, in the present embodiment, the pressure or flow rate of the refrigerant is coordinately controlled on the basis of a request of the fuel cell system 100 (or the fuel cell stack 110) and the air conditioning request. It should be noted that the normal output torque of the refrigerant compressor 61 is set according to an automatically set room temperature in an auto-mode in which vehicle room temperature is automatically set. Further, in a manual mode in which vehicle room temperature is arbitrarily set by a driver or the like, the normal output torque is set according to an arbitrarily set room temperature.

As just described, in the present embodiment, a switch is made to the drive of a compressor 10 only by an electric motor 20, that only by the turbine 30 or that by the electric motor 20 and the turbine 30 according to the differential torque. Here, the differential torque changes according to a state (pressure or flow rate) of the refrigerant serving as the power source.

That is, in the present embodiment, the drive of the compressor 10 by one or both of the electric motor 20 and the turbine 30 can be selected according to the state of the refrigerant serving as the power source, and the compressor 10 can be driven by a proper driving source corresponding to an operating state of the fuel cell system 100. The aforementioned refrigerant pressure boost threshold value may be appropriately set such that the compressor 10 can be driven at a suitable ratio of the output torques of the electric motor 20 and the turbine 30 corresponding to the operating state of the fuel cell system 100.

In Step S205, the controller 140 drives the compressor 10 by the electric motor 20 and the turbine 30 or drives the compressor 10 only by the turbine 30 by variably controlling the output torque of the electric motor 20 according to the outputtable torque of the turbine 30 determined on the basis of the pressure or flow of the refrigerant.

Specifically, the controller 140 fully opens a flow rate control valve 71, sets a target output torque of the electric motor 20 to the differential torque and drives the compressor 10 by the electric motor 20 and the turbine 30 when the outputtable torque of the turbine 30 is smaller than the target output torque of the compressor 10 (differential torque >0).

On the other hand, the controller 140 controls the output torque of the electric motor 20 to zero and drives the compressor 10 only by the output of the turbine 30 when the outputtable torque of the turbine 30 is not smaller than the target output torque of the compressor 10 (differential torque ≤0).

In the case of driving the compressor 10 only by the turbine 30, the compressor 10 is driven by a torque (=outputtable torque) not smaller than the target output torque of the compressor 10 calculated in Step S3 if the flow rate control valve 71 is fully opened. Accordingly, in the present embodiment, an opening degree of the flow rate control valve 71 is controlled such that the output torque of the turbine 30 reaches the target output torque in the case of driving the compressor 10 only by the turbine 30. Specifically, the flow rate control valve 71 is feedback-controlled such that a compressor suction flow rate reaches a target compressor suction flow rate.

It should be noted that excess cathode gas unnecessary for the fuel cell stack 110 may be flowed to a bypass passage 127 by a bypass control by fully opening the flow rate control valve 71 as in the first embodiment.

In Step S206, the controller 140 fully closes the flow rate control valve 71, sets the target output torque of the electric motor 20 to the target output torque of the compressor 10 calculated in Step S3 and drives the compressor 10 only by the electric motor 20. By fully closing the flow rate control valve 71 in this way, it is not necessary to uselessly drive the turbine 30.

It should be noted that since the turbine 30 needs not be driven by fully closing the flow rate control valve 71 in the present embodiment, the clutch 40 may be kept in a connected state without being set in a released state in Step S11 although the turbine 30 acts as a load.

According to the second embodiment described above, the following effects can be obtained.

According to the present embodiment, the refrigerant circulating in the pipings 66A to 66D for air conditioning is used as the power source of the turbine 30. The controller 140 controls the state (pressure or flow rate) of the refrigerant serving as the power source on the basis of the operating state of the fuel cell system 100 (or the fuel cell stack 110) and selects the driving source to be used out of the compressor driving sources on the basis of the state of the refrigerant, wherefore effects similar to those of the first embodiment are obtained. Further, a bearing and the like of the turbine 30 can be lubricated by an oil component contained in the refrigerant for air conditioning. Furthermore, since the turbine 30 is driven by the refrigerant, the turbine 30 can be driven even in an operating state where the anode gas is not supplied.

Further, in the present embodiment, the controller 140 coordinately controls the pressure or flow rate of the refrigerant on the basis of the request of the fuel cell system 100 (or the fuel cell stack 110) and the air conditioning request.

Accordingly, the output of the turbine 30 can be increased by boosting the pressure or flow rate of the refrigerant by the refrigerant compressor 61 having lower power consumption than the electric motor 20, for example, if the output of the turbine 30 is low. Thus, the output of the electric motor 20 can be suppressed. Therefore, it is possible to miniaturize the electric motor 20 and enhance the energy efficiency of the fuel cell system 100.

Figure 11:
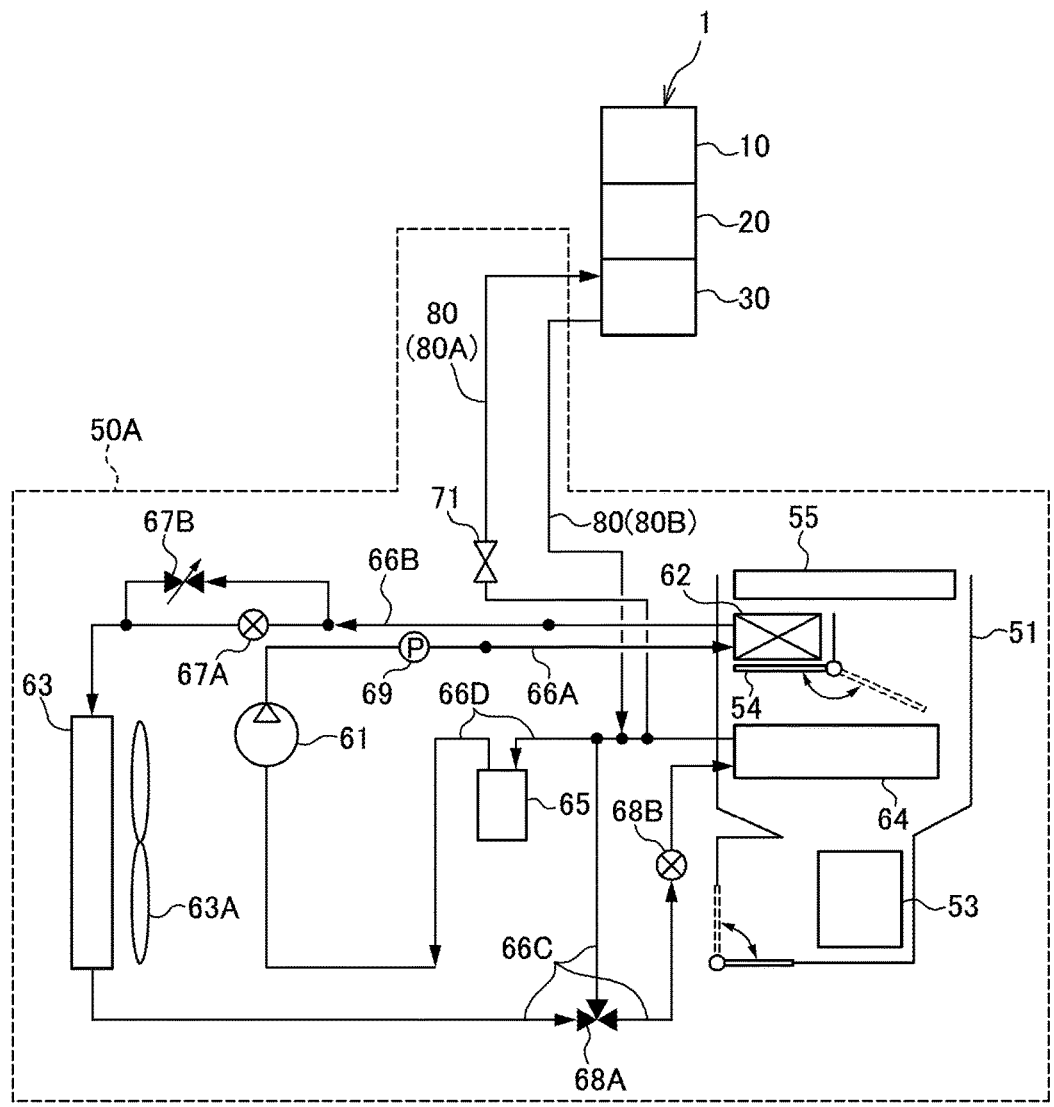
FIG. 11 shows one modification of the fluid supplying device of the second embodiment of the present invention.

It should be noted that although, out of the refrigerant circulating in the pipings 66A to 66D, the refrigerant discharged from the refrigerant compressor 61 and having a relatively high pressure is utilized as the working fluid for driving the turbine 30 in the present embodiment, it is also possible to utilize the refrigerant having a relatively low temperature and to be sucked into the refrigerant compressor 61 as shown in FIG. 11.

Specifically, the air conditioner 50A is provided with a piping 80 branched off from the piping 66D, in which, out of the refrigerant circulating in the pipings 66A to 66D, the refrigerant having a relatively low temperature and to be sucked into the refrigerant compressor 61 flows, and connected to the piping 66D again, and the turbine 30 is arranged in the piping 80. The piping 80 is composed of a piping 80A connecting the piping 66D and the suction port of the turbine 30 and a piping 80B connecting the discharge port of the turbine 30 and the piping 66D and the flow rate control valve 71 is provided in the piping 80B.

Also by this configuration, effects similar to the above can be obtained and, besides, the turbine 30 can be cooled since the turbine 30 can be driven by the refrigerant having a relatively low temperature and to be sucked into the refrigerant compressor 61.

Third Embodiment

Next, a third embodiment of the present invention is described with reference to FIG. 12.

The present embodiment differs from the second embodiment in the configuration of the working fluid supplying device 50. The following description is centered on that point of difference.

Figure 12:
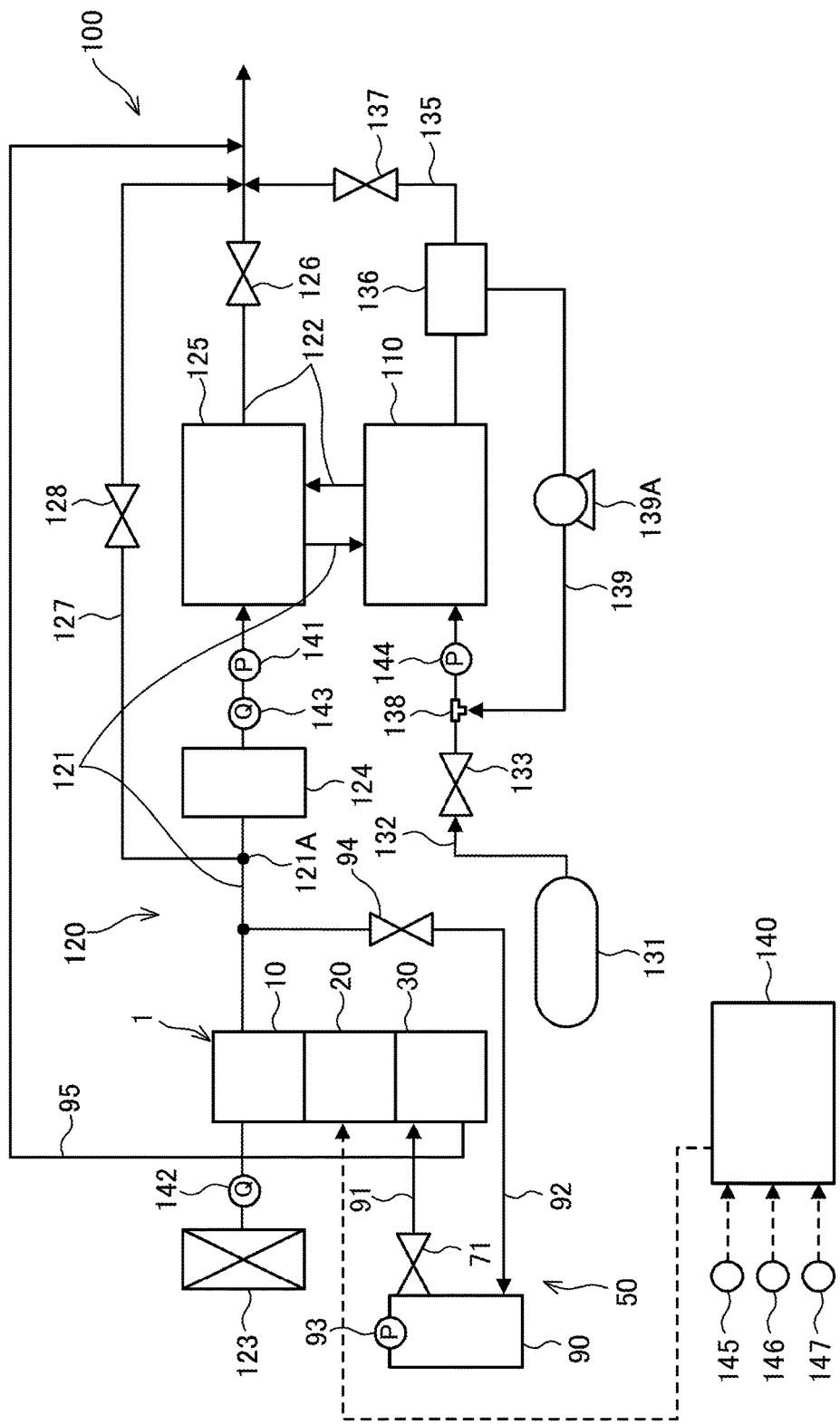
FIG. 12 is a schematic configuration diagram of a fuel cell system according to a third embodiment of the present invention.

As shown in FIG. 12, a working fluid supplying device 50 according to the present embodiment includes a pressure accumulating tank 90 configured to accumulate compressed air, and supplies the compressed air accumulated in the pressure accumulating tank 90 as working fluid for driving a turbine 30 of a cathode gas supplying device 1 to the turbine 30.

Thus, the working fluid supplying device 50 according to the present embodiment includes a piping 91 connecting the pressure accumulating tank 90 and a suction port of the turbine 30 as a passage for supplying the compressed air accumulated in the pressure accumulating tank 90 to the turbine 30. Further, a piping 92 branched off from a part of a cathode gas supply passage 121 upstream of a connected part 121A of the cathode gas supply passage 121 and a bypass passage 127 and connected to the pressure accumulating tank 90 is provided as a passage for introducing cathode gas as the compressed air to the pressure accumulating tank 90. Furthermore, a piping 95 connecting a discharge port of the turbine 30 and a part of a cathode gas discharge passage 122 downstream of a cathode pressure control valve 126 is provided as a passage for discharging the compressed air having driven the turbine 30.

A compressed air pressure sensor 93 configured to detect a pressure in the pressure accumulating tank 90 is provided in the pressure accumulating tank 90. A flow rate control valve 71 similar to that of the second embodiment and configured to adjust a flow rate of the compressed air to be supplied to the turbine 30 is provided in a connecting part of the pressure accumulating tank 90 and the piping 91. A rotational drive force of the turbine 30 is controlled by controlling the flow rate control valve 71 according to the pressure in the pressure accumulating tank 90 and adjusting the pressure or flow rate of the compressed air to be supplied to the turbine 30.

An on-off valve 94 which is controlled to open and close by the controller 140 and opened when the compressed air is introduced into the pressure accumulating tank 90 is provided in the piping 92.

Figure 13:
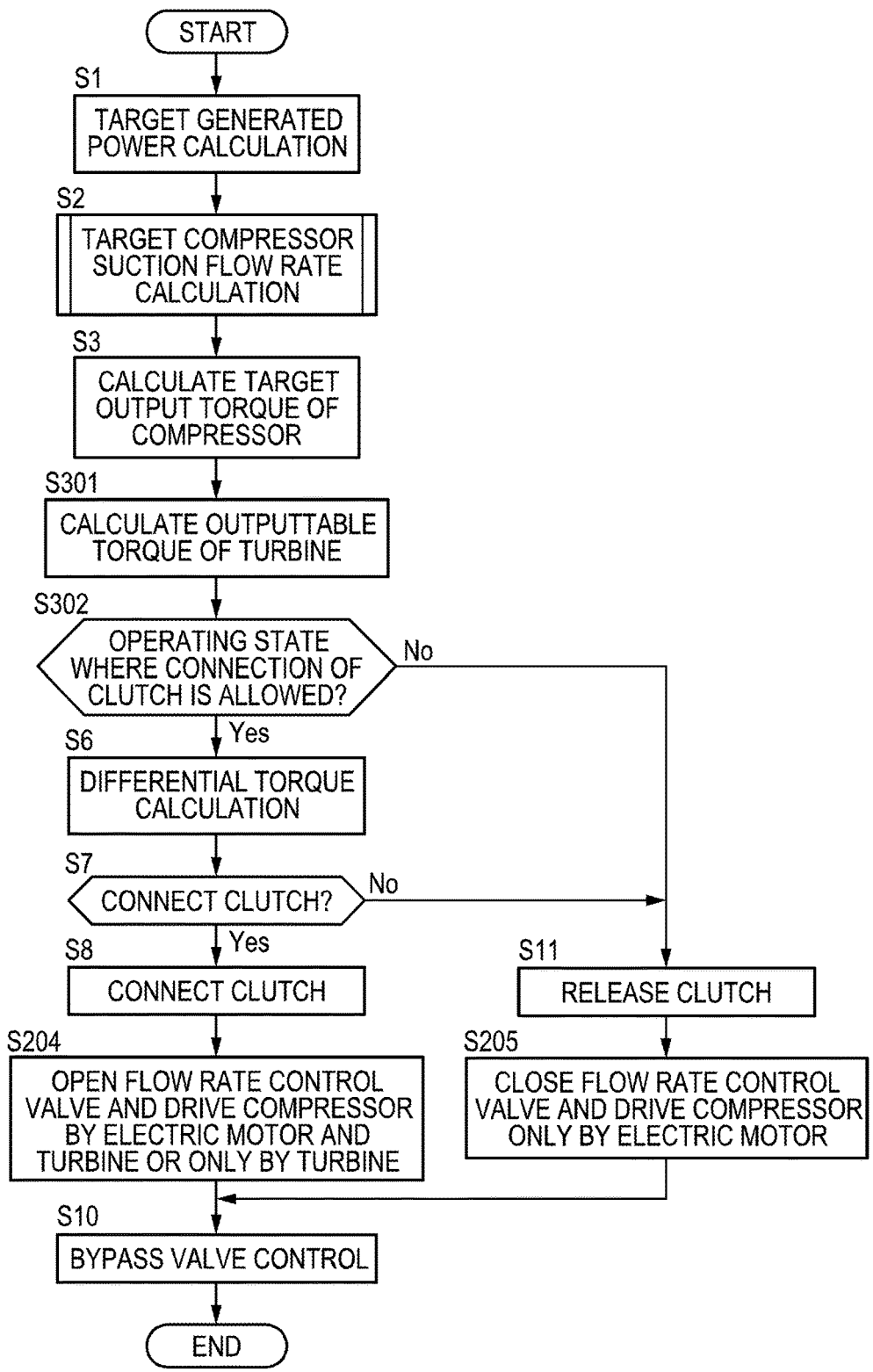
FIG. 13 is a flow chart showing a cathode gas supply control of the fuel cell system according to the third embodiment of the present invention.

A cathode gas supply control of the fuel cell system 100 according to the third embodiment executed by the controller 140 is described below with reference to a flow chart of FIG. 13.

Figure 14:
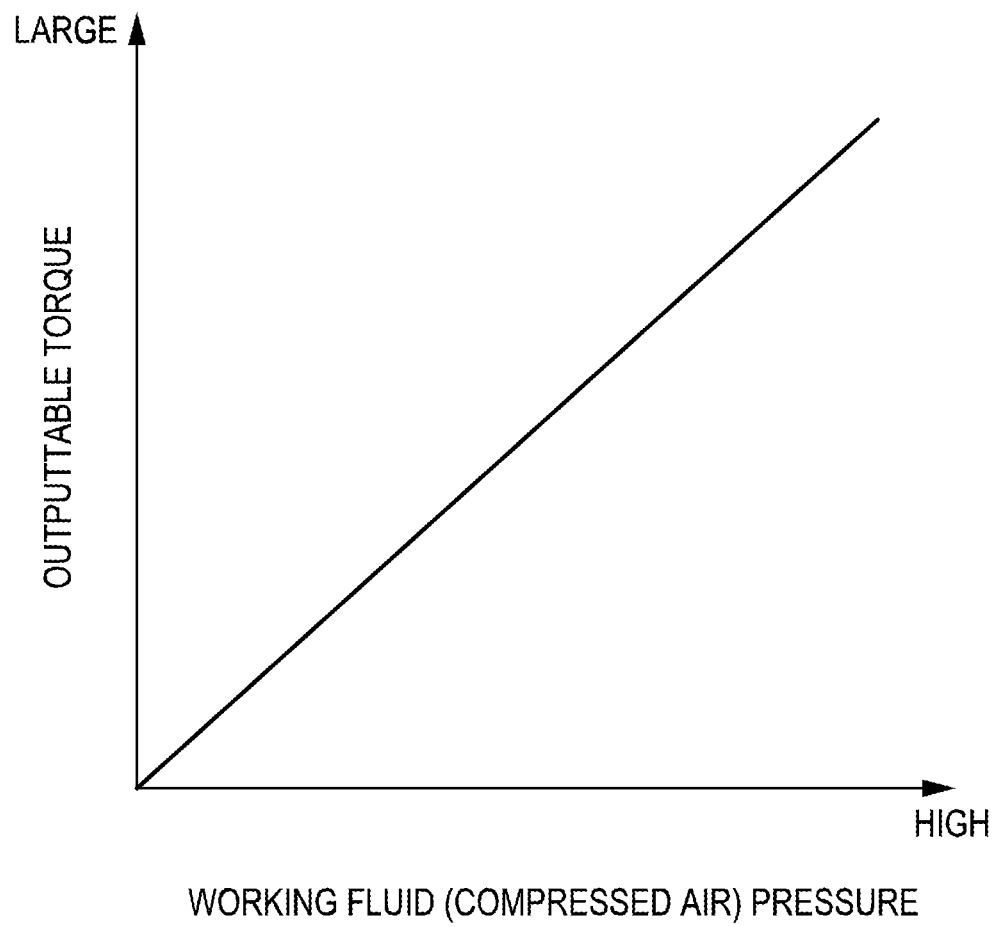
FIG. 14 is a table for calculating an outputtable torque of a turbine on the basis of compressed air as working fluid.

In Step S301, the controller 140 calculates an outputtable torque of the turbine 30 on the basis of the amount of energy of the compressed air as the working fluid to be supplied to the turbine 30. Specifically, as shown in a table of FIG. 14, the outputtable torque of the turbine 30 is calculated on the basis of the pressure of the compressed air detected by the compressed air pressor sensor 93. It should be noted that the outputtable torque of the turbine 30 can also be calculated on the basis of the flow rate of the compressed air as in the first embodiment.

In Step S302, the controller 140 determines whether or not an operating state where the connection of a clutch 40 is allowed is set. The controller 140 proceeds to a processing of Step S11 without allowing the connection of the clutch 40 in an operating state where the pressure of compressed air detected by the compressed air pressure sensor 93 is not higher than a predetermined pressure and the pressure in the pressure accumulating tank is extremely low while proceeding to a processing of Step S6 unless otherwise.

Figure 15:
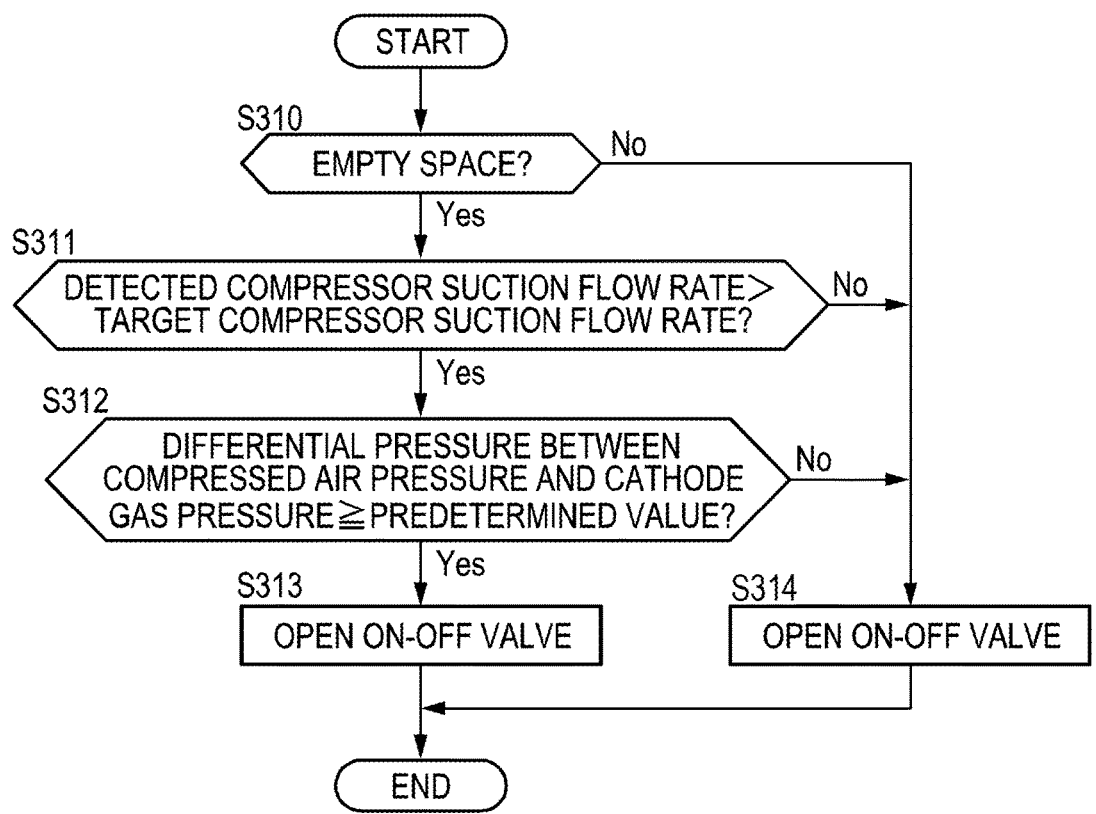
FIG. 15 is a flow chart showing a control of an on-off valve according to the third embodiment of the present invention.

FIG. 15 is a flow chart showing a control of the on-off valve 94 according to the third embodiment executed by the controller 140 in parallel with a control of the cathode gas supplying device 1.

In Step S310, the controller 140 makes a pressure accumulation allowing determination as to whether or not there is an empty space enough to introduce the cathode gas in the pressure accumulating tank 90. Specifically, the controller 140 determines whether or not the pressure of the compressed air in the pressure accumulating tank 90 detected by the compressed air pressure sensor 93 is smaller than a pressure accumulation allowing threshold value. The controller 140 determines the presence of the empty space and proceeds to a processing of Step S311 if the pressure of the compressed air in the pressure accumulating tank 90 is smaller than the pressure accumulation allowing threshold value. On the other hand, the controller 140 determines the absence of the empty space and proceeds to a processing of Step S314 if the pressure of the compressed air in the pressure accumulating tank 90 is not smaller than the pressure accumulation allowing threshold value.

In Step S311, the controller 140 determines whether or not the compressor 10 is sucking the cathode gas at a flow rate not smaller than a target compressor suction flow rate. Specifically, the controller 140 determines whether or not a detected compressor suction flow rate is larger than the target compressor suction flow rate. The controller 140 determines that the compressor 10 is sucking the cathode gas more than necessary and the pressure accumulating tank 90 has room to introduce excess cathode gas and proceeds to a processing of Step S312 if the detected compressor suction flow rate is larger than the target compressor suction flow rate. On the other hand, the controller 140 proceeds to a processing of Step S314 if the detected compressor suction flow rate is not larger than the target compressor suction flow rate.

In Step S312, the controller 140 determines whether or not a differential pressure between the pressure of the compressed air in the pressure accumulating tank 90 detected by the compressed air pressure sensor 93 and the pressure of the cathode gas to be supplied to the fuel cell stack 110 detected by a cathode pressure sensor 141 is not smaller than a predetermined value. The controller 140 proceeds to a processing to Step S313 to introduce the cathode gas discharged from the compressor 10 to the pressure accumulating tank 90 if the differential pressure is not smaller than the predetermined value. On the other hand, the controller 140 proceeds to a processing to Step S314 if the differential pressure is smaller than the predetermined value. Such a determination is made because the cathode gas discharged from the compressor 10 flows more than necessary into the piping 92 on the side of the pressure accumulating tank 90 and the cathode gas necessary for power generation may not flow into the cathode gas supply passage 121 on the side of the fuel cell stack 110 unless the on-off valve 94 is opened in a state where the pressure of the compressed air in the pressure accumulating tank 90 is higher to a certain degree than the pressure of the cathode gas to be supplied to the fuel cell stack 110.

In Step S313, the controller 140 opens the on-off valve 94 and introduces an excess of the cathode gas discharged from the compressor 10 to the pressure accumulating tank 90.

In Step S314, the controller 140 closes the on-off valve 94.

According to the third embodiment described above, the following effects can be obtained.

According to the present embodiment, the compressed air supplied from the pressure accumulating tank 90 configured to accumulate the excess cathode gas discharged from the compressor is used as a power source of the turbine 30. The controller 140 controls the state (pressure or flow rate) of the compressed air serving as the power source on the basis of an operating state of the fuel cell system 100 (or the fuel cell stack 110) and selects the driving source to be used out of compressor driving sources on the basis of the state of the compressed air, wherefore effects similar to those of the first embodiment are obtained. Further, since the turbine 30 is driven by the compressed air, the turbine 30 can be driven even in an operating state where the anode gas is not supplied.

Further, according to the present embodiment, the on-off valve 94 is provided in the piping 92 as an introduction passage for introducing the excess cathode gas discharged from the compressor into the pressure accumulating tank 90, and the controller 140 opens the on-off valve 94 when the compressor 10 is discharging the excess cathode gas unnecessary for the power generation of the fuel cell stack 110.

Thus, when the compressor 10 is sucking the cathode gas at a flow rate not lower than the target compressor suction flow rate, the excess cathode gas can be first introduced into the pressure accumulating tank 90 and a flow rate of the cathode gas needed to flow into the bypass passage 127 can be reduced. Accordingly, a valve body of a bypass valve 128 can be made smaller, wherefore the miniaturization and low cost of the bypass valve 128 can be realized. Further, since the excess cathode gas can be effectively reutilized by being introduced into the pressure accumulating tank 90, the energy efficiency of the fuel cell system 100 can be increased.

Fourth Embodiment

Next, a fourth embodiment of the present invention is described with reference to FIG. 16.

The present embodiment differs from the third embodiment in the configuration of the working fluid supplying device 50. The following description is centered on that point of difference.

Figure 16:
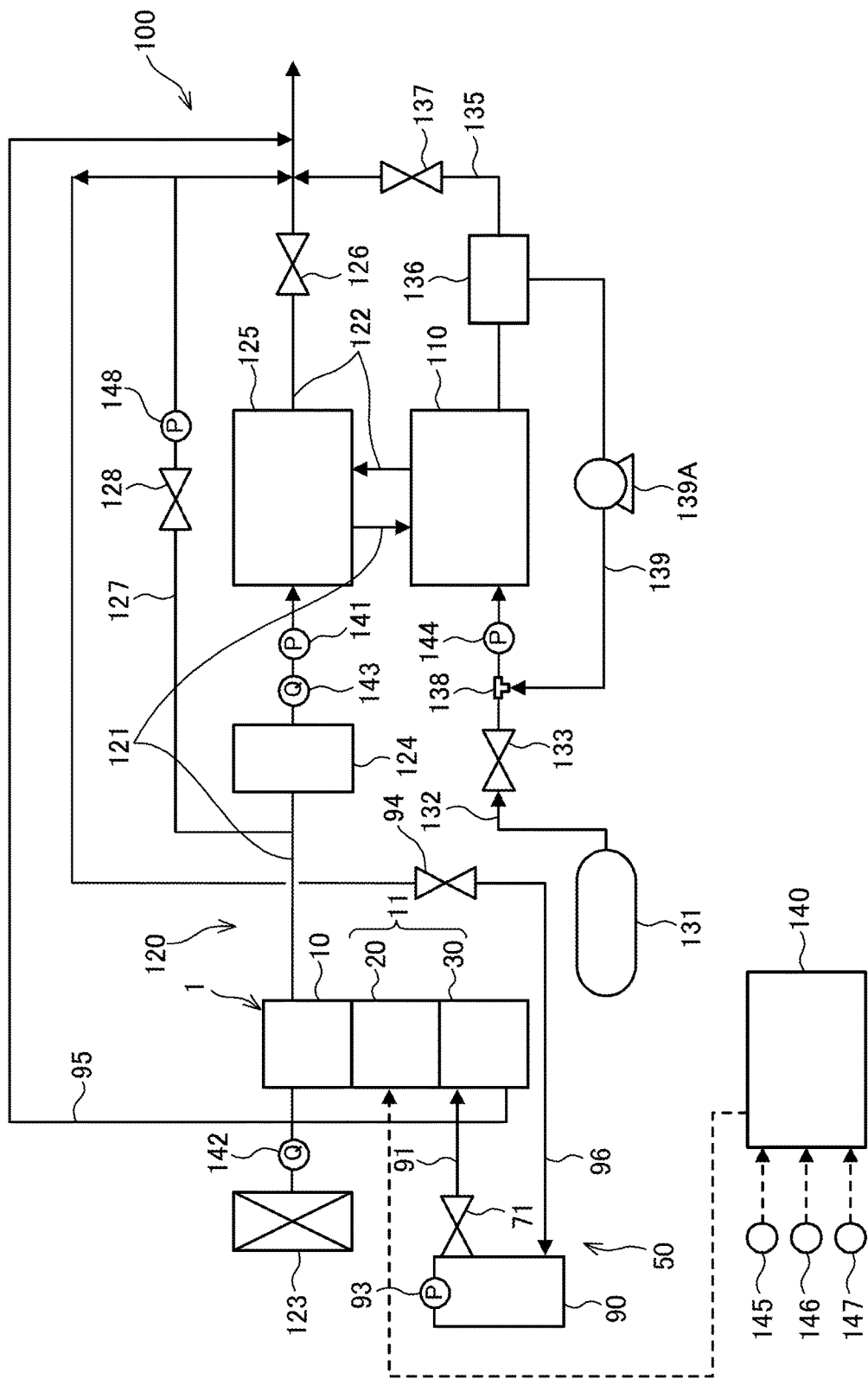
FIG. 16 is a schematic configuration diagram of a fuel cell system according to a fourth embodiment of the present invention.

As shown in FIG. 16, a working fluid supplying device 50 according to the present embodiment is configured to introduce cathode gas into a pressure accumulating tank 90 via a piping 96 branched off from a part of a bypass passage 127 downstream of a bypass valve 128. A bypass valve downstream pressure detection sensor 148 configured to detect a pressure of the cathode gas downstream of the bypass valve 128 is provided in a part of the bypass passage 127 downstream of the bypass valve 128.

Figure 17:
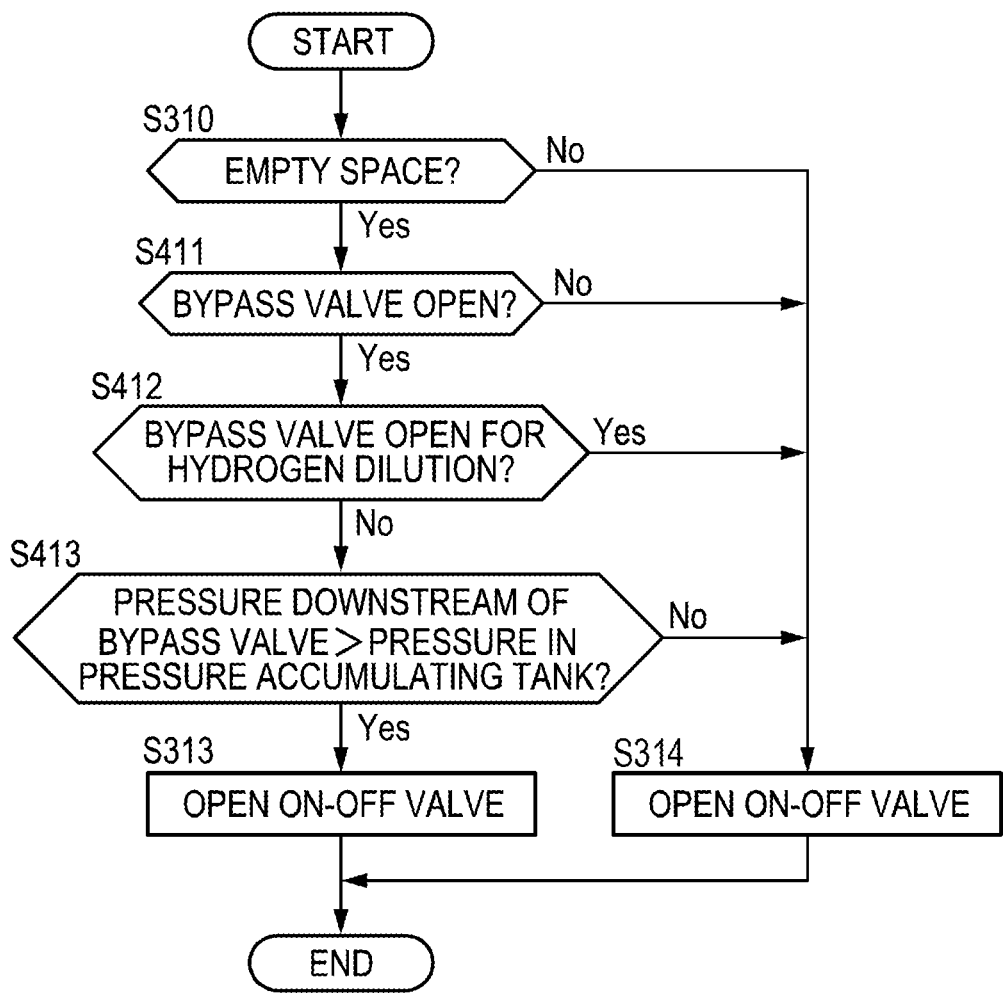
FIG. 17 is a flow chart showing a control of an on-off valve according to the fourth embodiment of the present invention.

FIG. 17 is a flow chart showing a control of an on-off valve 94 according to the fourth embodiment executed by a controller 140 in parallel with a control of a cathode gas supplying device 1.

In Step S411, the controller 140 determines whether or not an operating state where excess cathode gas is being discharged from a compressor 10 is set. Specifically, the controller 140 determines whether or not the bypass valve 128 is open. The controller 140 proceeds to a processing of Step S412 if the bypass valve 128 is open while proceeding to a processing of Step S314 if the bypass valve 128 is closed.

In Step S412, the controller 140 determines whether or not the bypass valve 128 is open for hydrogen dilution. Specifically, the controller 140 determines whether or not a dilution request compressor suction flow rate is set as a target compressor suction flow rate. Such a determination is made because it may not be possible to sufficiently dilute hydrogen if the cathode gas is introduced into the pressure accumulating tank 90 by opening the on-off valve 94 when the bypass valve 128 is open for hydrogen dilution. The controller 140 proceeds to the processing of Step S314 if the bypass valve 128 is open for hydrogen dilution while proceeding to a processing of Step S413 unless otherwise.

In Step S413, the controller 140 determines whether or not the pressure downstream of the bypass valve 128 detected by the bypass valve downstream pressure detection sensor 148 is larger than a pressure of compressed air in the pressure accumulating tank 90 detected by a compressed air pressure sensor 93. The controller 140 proceeds to a processing of Step S313 if the pressure downstream of the bypass valve 128 is larger than the pressure of the compressed air in the pressure accumulating tank 90 while proceeding to the processing of Step S314 unless otherwise.

According to the fourth embodiment described above, the following effects can be obtained.

The present embodiment is provided with the bypass passage 127 configured to discharge part of the cathode gas discharged from the compressor 10 by bypassing the fuel cell stack 110 and the bypass valve 128 provided in the bypass passage 127 and configured to adjust the flow rate of the cathode gas flowing in the bypass passage 127. The controller 140 prohibits the opening of the on-off valve 94 when the compressor 10 is discharging the excess cathode gas unnecessary for power generation to reduce a hydrogen concentration in discharged gas discharged from the fuel cell system 100.

Thus, the cathode gas passing in the bypass passage 127 can be introduced into the pressure accumulating tank 90, wherefore the cathode gas discharged to the outside of the system thus far can be effectively reutilized and the energy efficiency of the fuel cell system 100 can be increased. Further, since the opening of the on-off valve 94 is prohibited when the cathode gas is flowing in the bypass passage 127 to reduce the hydrogen concentration in the discharged gas, the hydrogen concentration in the discharged gas can be reliably set to or below a discharge allowable concentration.

Although the embodiments of the present invention have been described above, the above embodiments are merely an illustration of some application examples of the present invention and not intended to limit the technical scope of the present invention to the specific configurations of the above embodiments.

Although the cathode gas supplying device 1 according to each of the above embodiments is mounted in the fuel cell system 100 for vehicle, it may be mounted in fuel cell systems for movable bodies other than vehicles or stationary fuel cell systems.

Further, although the cathode gas supplying device 1 according to each of the above embodiments includes the turbine 30 as a driving source for driving the compressor, a piston motor or a diaphragm motor to be driven upon receiving the supply of working fluid or the like may be provided as a driving source.

Figure 18:
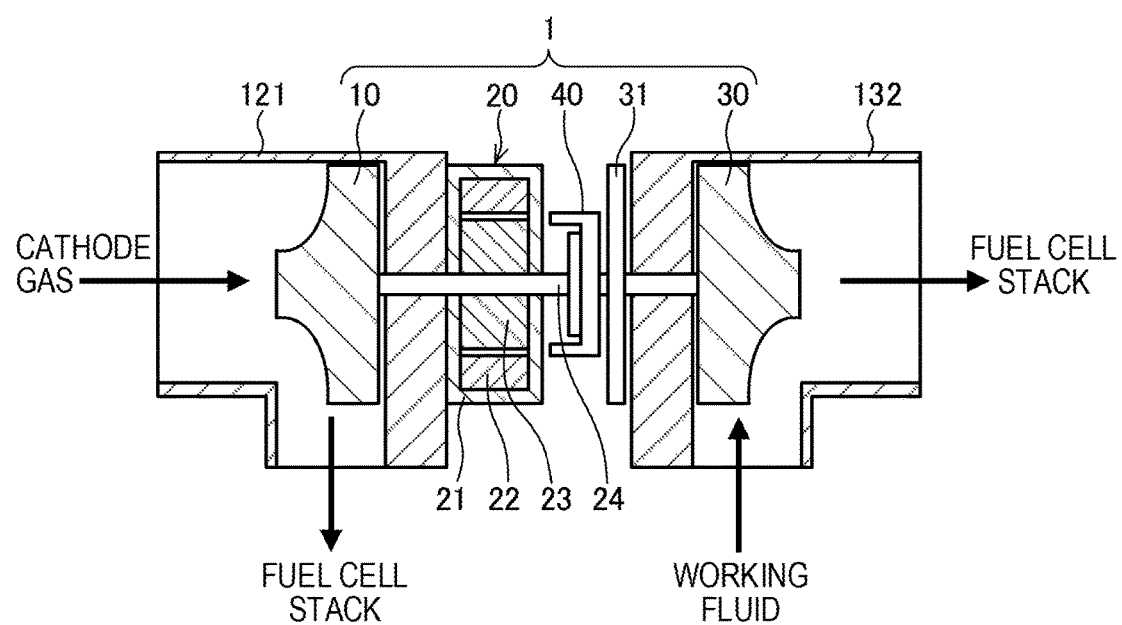
FIG. 18 shows one modification of the cathode gas supplying device according to the first embodiment of the present invention.

Further, the cathode gas supplying device 1 can also be configured such that the turbine 30 includes a flywheel 31, for example, as shown in FIG. 18 without being limited to the configuration of each of the above embodiments.

The flywheel 31 is a disk-like weight member and fixed to a rotation center axis of the turbine 30. The flywheel 31 of the turbine 30, the electric motor 20 and the compressor 10 are coaxially arranged. The flywheel 31 is provided at a position closer to the turbine 30 than the clutch 40 and outside the anode gas supply passage 132. It should be noted that the flywheel 31 may be provided in the anode gas supply passage 132.

By configuring the turbine 30 to include the flywheel 31 in this way, rotational energy of the turbine 30 can be accumulated in the flywheel 31. By accumulating the rotational energy in the flywheel 31 in this way, a reduction in the rotation speed of the compressor 10 when the clutch 40 is engaged can be suppressed. In this way, it is possible to prevent a temporary reduction of a cathode gas supply amount immediately after the engagement of the clutch 40 and realize suitable cathode gas supply corresponding to the operating state of the fuel cell system 100.

The invention claimed is:

1. A fuel cell system including a fuel cell configured to generate power by having an anode gas and a cathode gas respectively supplied to an anode and a cathode of the fuel cell, the fuel cell system comprising:
    a compressor configured to supply the cathode gas to the fuel cell;
    a driving device configured to drive the compressor; and
    a control unit configured to control the driving device on the basis of an operating state of the fuel cell,
    wherein the driving device comprises
        at least two driving sources including a drive motor and a turbine to be driven by a working fluid, the working fluid being one selected from the group consisting of the anode gas, the cathode gas, a refrigerant circulating in a piping for air conditioning, and a compressed air supplied from a pressure accumulating tank, and
    a clutch in a power transmission path, wherein a drive force of the turbine is transmitted to the compressor in the power transmission path, and
    wherein the control unit is further configured to calculate a target output torque of the compressor on the basis of the operating state of the fuel cell, calculate an outputtable torque of the turbine on the basis of a pressure or a flow rate of the working fluid, and select either one or both of the drive motor and the turbine as a driving source on the basis of the target output torque of the compressor and the outputtable torque of the turbine, by controlling the clutch.

2. The fuel cell system according to claim 1, wherein the control unit is further configured to control the drive motor on the basis of the operating state of the fuel cell and control the clutch on the basis of a state of the working fluid so as to compensate for a drive force of the drive motor by the drive force of the turbine.

3. The fuel cell system according to claim 1,
wherein the anode gas supplied to the fuel cell is used as the working fluid.

4. The fuel cell system according to claim 1,
wherein the anode gas supplied to the fuel cell is used as the working fluid, and
wherein the control unit is further configured to release the clutch and drive the compressor only by the drive motor when an operating state where the anode gas is not supplied to the fuel cell is set by a request of the fuel cell.

5. The fuel cell system according to claim 1,
wherein the anode gas supplied to the fuel cell is used as the working fluid, and
wherein the control unit is further configured to release the clutch and drive the compressor only by the drive motor in an initial stage during starting the fuel cell or in a late stage during stopping the fuel cell.

6. The fuel cell system according to claim 1,
wherein the anode gas supplied to the fuel cell is used as the working fluid, and
wherein the control unit is further configured to intermittently supply the cathode gas to the fuel cell by engaging and releasing the clutch when an operating state where the cathode gas is intermittently supplied while the anode gas is supplied to the fuel cell is set.

7. The fuel cell system according to claim 1,
wherein a refrigerant circulating in a piping for air conditioning is used as the working fluid.

8. The fuel cell system according to claim 7,
wherein the control unit is further configured to coordinately control a pressure or flow rate of the refrigerant on the basis of a request of the fuel cell and an air conditioning request.

9. The fuel cell system according to claim 1,
wherein a compressed air supplied from a pressure accumulating tank is used as the working fluid, and the pressure accumulating tank is configured to accumulate an excess cathode gas discharged from the compressor.

10. The fuel cell system according to claim 9,
wherein an on-off valve is provided in an introduction passage for introducing the excess cathode gas discharged from the compressor to the pressure accumulating tank, and
wherein the control unit is further configured to open the on-off valve when the compressor is discharging the excess cathode gas unnecessary for power generation of the fuel cell.

11. The fuel cell system according to claim 10, further comprising:
a bypass passage configured to discharge a part of the cathode gas discharged from the compressor by bypassing the fuel cell; and
a bypass valve provided in the bypass passage and configured to adjust a flow rate of the cathode gas flowing in the bypass passage,
wherein the control unit is further configured to prohibit opening of the on-off valve when the compressor is discharging the excess cathode gas unnecessary for power generation so as to reduce a hydrogen concentration in discharged gas discharged from the fuel cell system.

12. A fuel cell system including a fuel cell configured to generate power by having an anode gas and a cathode gas respectively supplied to an anode and a cathode of the fuel cell, the fuel cell system comprising:
a compressor configured to supply cathode gas to the fuel cell;
a driving device configured to drive the compressor; and
a control unit configured to control the driving device on the basis of an operating state of the fuel cell,
wherein the driving device comprises at least two driving sources including a drive motor and a turbine to be driven by a working fluid, the working fluid being one selected from the group consisting of the anode gas and the cathode gas,
wherein the control unit is further configured to calculate a target output torque of the compressor on the basis of the operating state of the fuel cell, calculate an outputtable torque of the turbine on the basis of a pressure or a flow rate of the working fluid, and select either one or both of the drive motor and the turbine as a driving source on the basis of the target output torque of the compressor and the outputtable torque of the turbine,
wherein the driving device includes a clutch in a power transmission path and a drive force of the turbine is transmitted to the compressor in the power transmission path, and
wherein the control unit is further configured to control the drive motor on the basis of the operating state of the fuel cell and control the clutch on the basis of a state of the working fluid so as to compensate for a drive force of the drive motor by the drive force of the turbine.

* * * * *